US012792349B2

(12) United States Patent
Lies

(10) Patent No.: US 12,792,349 B2
(45) Date of Patent: Nov. 10, 2026

(54) MATRIX MULTIPLICATION ACCELERATOR WITH AN INPUT DELAY CIRCUIT

(71) Applicant: Texas Instruments Incorporated, Dallas, TX (US)

(72) Inventor: Garrett Lies, Rockwall, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 19/193,976

(22) Filed: Apr. 30, 2025

(65) Prior Publication Data

US 2026/0349735 A1 Nov. 5, 2026

(51) Int. Cl.

| | |
|---|---|
| ***G06F 9/30*** | (2018.01) |
| ***G06F 9/38*** | (2018.01) |
| ***G06F 17/16*** | (2006.01) |

(52) U.S. Cl.

CPC ........ *G06F 9/30098* (2013.01); *G06F 9/3001* (2013.01); *G06F 9/30036* (2013.01); *G06F 9/3824* (2013.01); *G06F 17/16* (2013.01)

(58) Field of Classification Search

CPC ............... G06F 9/30098; G06F 9/3001; G06F 9/30036; G06F 9/3824; G06F 17/16

See application file for complete search history.

(56) References Cited

U.S. PATENT DOCUMENTS

| | | | | |
|---|---|---|---|---|
| 10,387,122 | B1 * | 8/2019 | Olsen | G06N 3/0464 |
| 2019/0228051 | A1 * | 7/2019 | Langhammer | G06N 5/00 |
| 2020/0334038 | A1 * | 10/2020 | Anders | G06N 3/063 |
| 2021/0334142 | A1 * | 10/2021 | Wang | G06N 3/0495 |
| 2026/0037599 | A1 * | 2/2026 | Baker | G06F 17/16 |

* cited by examiner

*Primary Examiner* — Shawn Doman

(74) *Attorney, Agent, or Firm* — Michelle F. Murray; Charles F. Koch

(57) ABSTRACT

In described examples, a device includes a delay circuit, a data routing circuit, and an arithmetic logic unit (ALU). The delay circuit and data routing circuit each have multiple inputs and outputs. Each input of the delay circuit is coupled to a different output, and each input is provided to its corresponding output with a different delay. Each data input of the data routing circuit is coupled to a corresponding output of the delay circuit. The ALU has multiple first inputs, second inputs, first registers, sets of second registers, and sets of third registers. Each first input of the ALU is coupled to a corresponding output of the data routing circuit. Each first register is configured to load a value received from a corresponding first input of the ALU. Each of a first set of the second registers is configured to load a value received from a corresponding second input.

20 Claims, 23 Drawing Sheets

MATRIX MULTIPLICATION ACCELERATOR WITH AN INPUT DELAY CIRCUIT

TECHNICAL FIELD

This application relates generally to calculation accelerators, and more particularly to a matrix multiplication accelerator.

BACKGROUND

Matrix multiplication is used in a wide array of applications, including telecommunications, computer graphics, training and processing of data sets using convolutional neural networks, and various automotive and industrial applications. A matrix math accelerator (MMA) can be used to supplement other processing units to improve system processing speed and/or efficiency.

SUMMARY

In described examples, a device includes a delay circuit, a data routing circuit, and an arithmetic logic unit (ALU). The delay circuit and FSM each have multiple inputs and outputs. Each input of the delay circuit is coupled to a different output, and each input is provided to its corresponding output with a different delay. Each data input of the FSM is coupled to a corresponding output of the delay circuit. The ALU has multiple first inputs, second inputs, first registers, sets of second registers, and sets of third registers. Each first input of the ALU is coupled to a corresponding output of the FSM. Each first register is configured to load a value received from a corresponding first input of the ALU. Each register of a first set of the second registers is configured to load a value received from a corresponding second input.

In described examples, a device includes a delay circuit and an arithmetic logic unit (ALU). The delay circuit has multiple inputs and outputs. Each input of the delay circuit is coupled to a different output, and each input is provided to its corresponding output with a different delay. The ALU has multiple first inputs, second inputs, first registers, sets of second registers, and sets of third registers. Each first input of the ALU is coupled to a corresponding output of the delay circuit. Each first register is configured to load a value received from a corresponding first input of the ALU. Each register of a first set of the second registers is configured to load a value received from a corresponding second input.

In described examples, a device includes a delay circuit, a data routing circuit, an arithmetic logic unit (ALU), a memory, and a processor. The delay circuit and FSM each have multiple inputs and outputs. Each input of the delay circuit is coupled to a different output, and each input is provided to its corresponding output with a different delay. Each data input of the FSM is coupled to a corresponding output of the delay circuit. The ALU has multiple first inputs, second inputs, first registers, sets of second registers, and sets of third registers. Each first input of the ALU is coupled to a corresponding output of the FSM. Each first register is configured to load a value received from a corresponding first input of the ALU. Each register of a first set of the second registers is configured to load a value received from a corresponding second input. The memory is coupled to the delay circuit and to the ALU, and is configured to store instructions. The processor is coupled to the ALU and to the memory, and is configured to execute the instructions. The processor is also configured to control the ALU to multiply values stored in the first registers by values stored in the second registers to generate partial products, and to accumulate the partial products into the third registers.

DETAILED DESCRIPTION

Figure 1A:
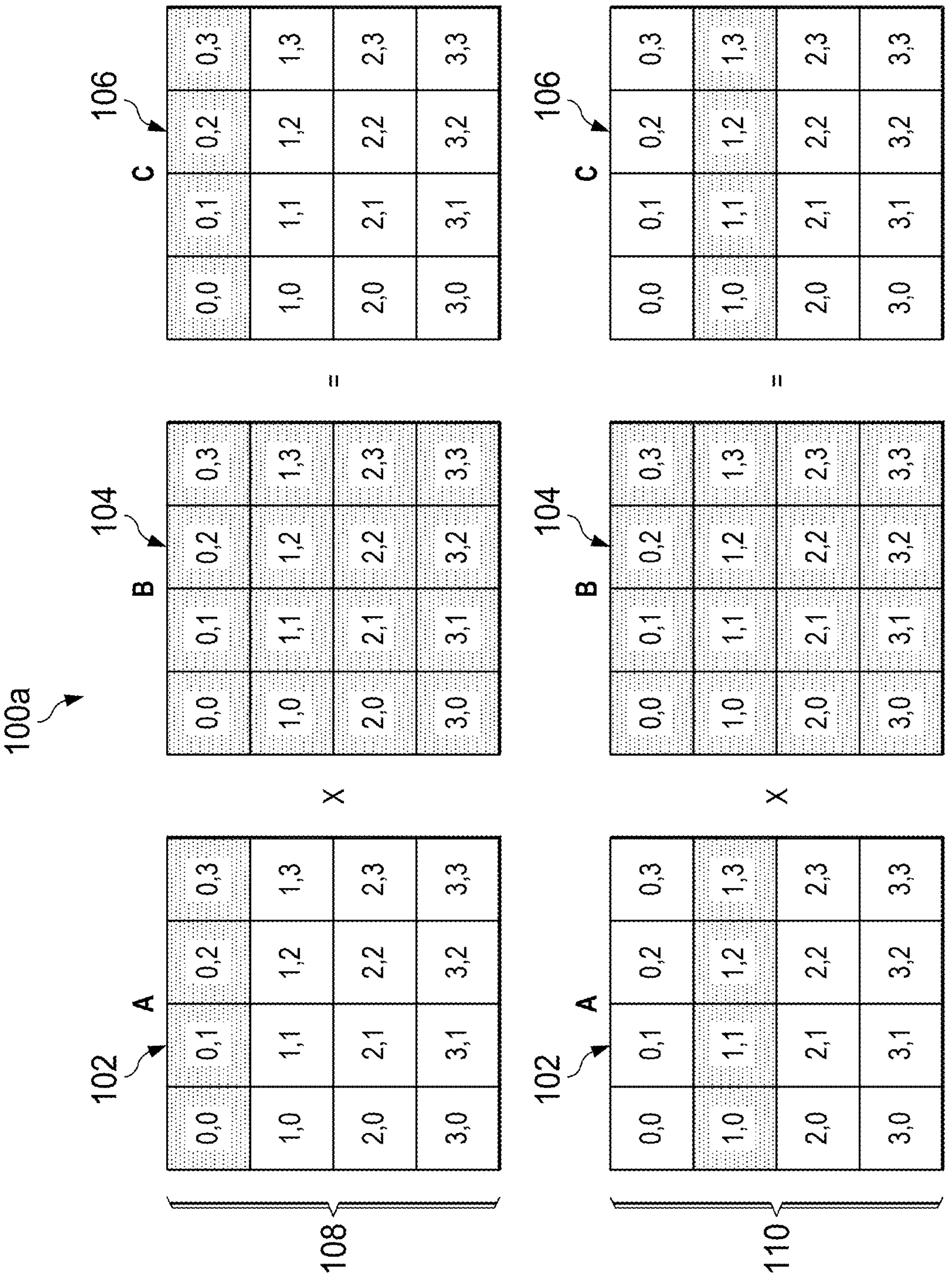
FIGS. 1A and 1B are an example inner product process for multiplying two matrices.

In some examples, a system for multiplying two matrices includes background (preparatory) memory, foreground (active) memory, and a matrix arithmetic unit. An example process for multiplying two matrices using the system loads in a whole multiplicand matrix at a time from background memory to foreground memory prior to performing the multiplication operation. After the multiplication operation, in some examples, a process for multiplying two matrices reads out a whole product matrix at a time from foreground memory to background memory. In contrast, time-staggering loading of elements of rows and columns of a multiplicand matrix into foreground memory enables avoiding loading in or reading out a whole matrix at a time. This time-staggering is enabled by delaying by different durations entry of different elements in a multiplicand matrix row or column into an arithmetic unit for performing the multiplication. Time-staggering as described enables some or all of a variety of benefits, including reduction in device area, reduction in design complexity, increased power draw stability, and improved memory stability.

Herein, some structures or signals that are distinct but related have reference numbers that use a [number][dash][number] format, such as a first slice 756-1 and a second slice 756-2. In some examples, these structures or signals are referred to generally, in the singular or as a group, using the [number] and without the [dash][letter], such as slices 756. Also, the same reference numbers or other reference designators are used in the drawings to designate features that are related structurally and/or functionally.

Figure 1B:
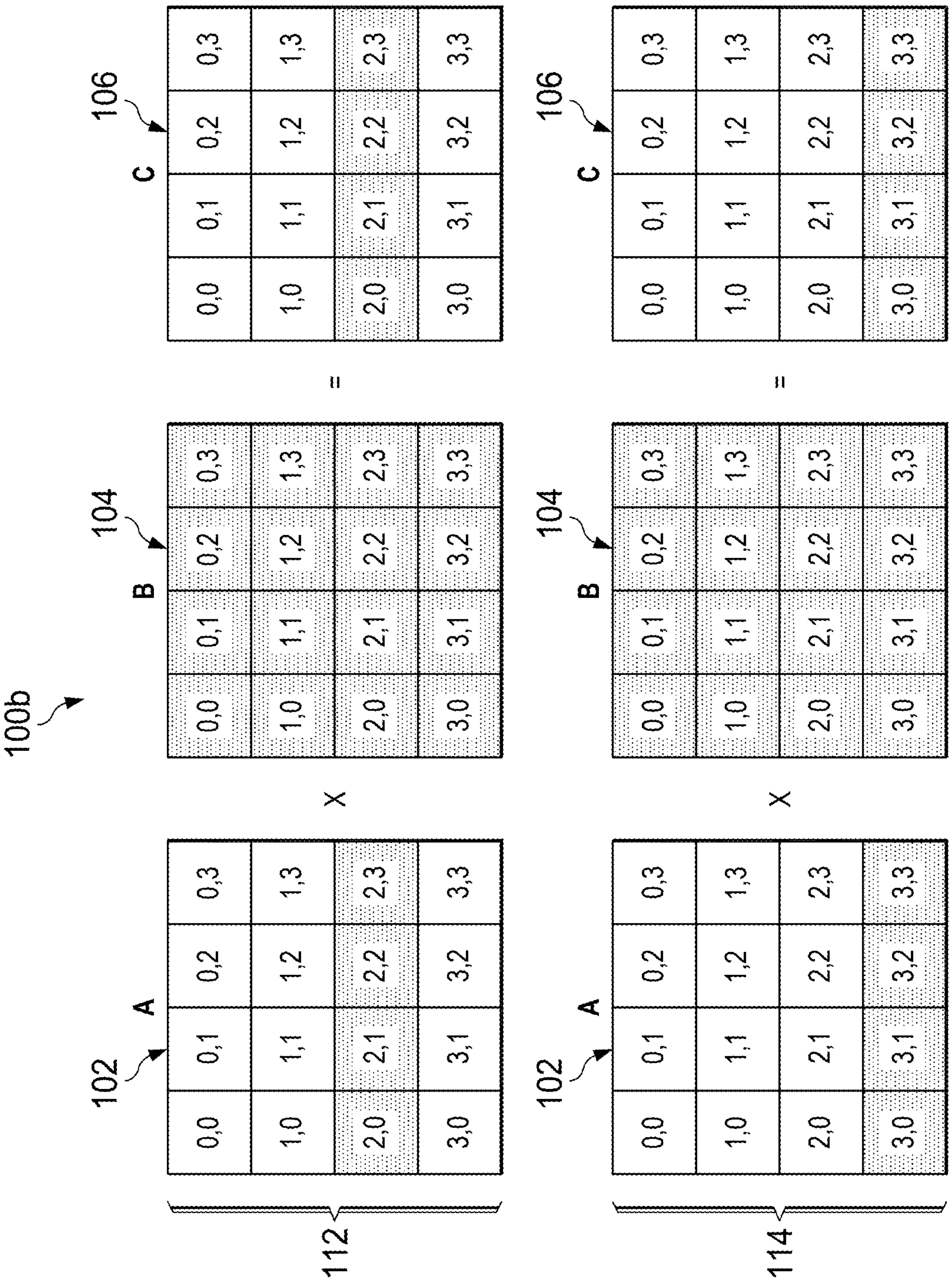

Inner product and outer product are two different approaches to performing matrix multiplication using computing hardware. A given hardware architecture may implement either approach (or in some cases both), and the hardware architecture and the approach may both be tuned for optimal performance. FIGS. 1A and 1B are an example inner product process 100 for multiplying two matrices. FIG. 1A is a first portion 100*a* of the process 100, and FIG. 1B is a second portion 100*b* of the process 100. A first matrix (matrix A) 102 is multiplied by a second matrix (matrix B) 104 to generate a third matrix (matrix C) 106. This is equivalent to generating a matrix C 106 with (row, column) elements (x, y) corresponding to multiplying row x in matrix A 102 by column y in matrix B 104 and summing the partial products (A(x, 0)×B(0, y)+A(x, 1)×B(1, y)+ . . . etc.)). Herein, a (row, column) element (x, y) of a matrix A 102 is represented as A(x, y). Also, herein, rows and columns are numbered starting at 0. Note that each element of the matrices 102, 104, and 106 is a number, such as an 8-bit unsigned integer, a 16-bit signed floating point number, or another numerical data type. In some examples, the elements of matrix C 106 have a greater bit depth than the elements of matrices A 102 and B 104 to accommodate multiply-accumulate results.

In an example, an (row x, column y) element of matrix C 106 equals the dot product of a vector corresponding to row x of matrix A 102 and a vector corresponding to column y of matrix B 104. Accordingly, for matrices A and B 102 and 104 of dimensions 4×4, element (x, y) of matrix C 106 is given by Equation 1.

$$A(x,0)\times B(0,y)+A(x,1)\times B(1,y)+A(x,2)\times B(2,y)+A(x,3)\times B(3,y)=C(x,y) \quad \text{Equation 1}$$

Equation 1 is shown diagrammatically in FIGS. 1A and 1B. In FIG. 1A, in step 108, a first row of matrix A 102 is multiplied by each column of matrix B 104 to generate a first row of matrix C 106. In step 110, a second row of matrix A 102 is multiplied by each column of matrix B 104 to generate a second row of matrix C 106. In FIG. 1B, in step 112, a third row of matrix A 102 is multiplied by each column of matrix B 104 to generate a third row of matrix C 106. In step 114, a fourth row of matrix A 102 is multiplied by each column of matrix B 104 to generate a fourth row of matrix C 106.

Figure 2A:
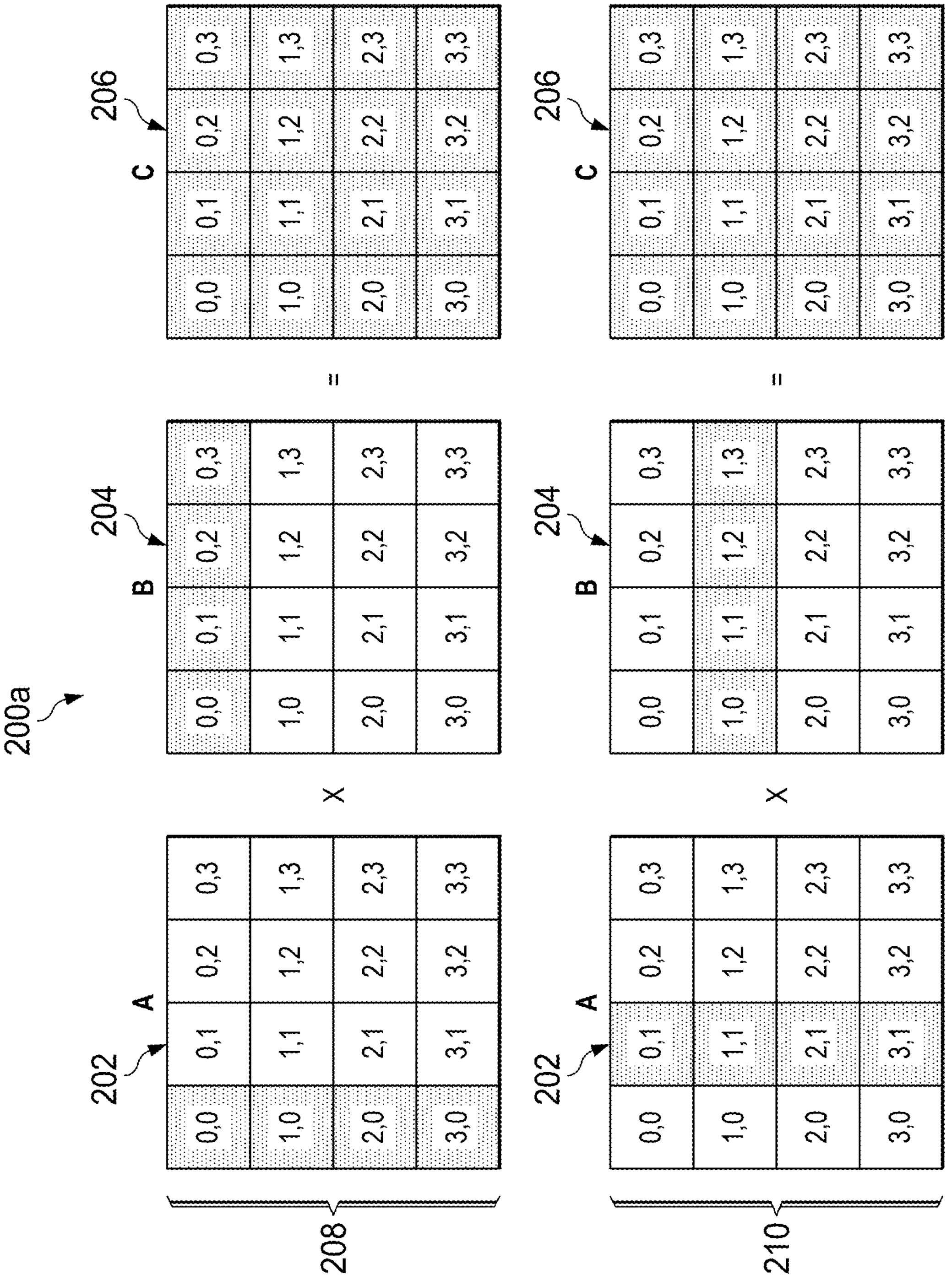
FIGS. 2A and 2B are an example outer product process for multiplying two matrices.
Figure 2B:
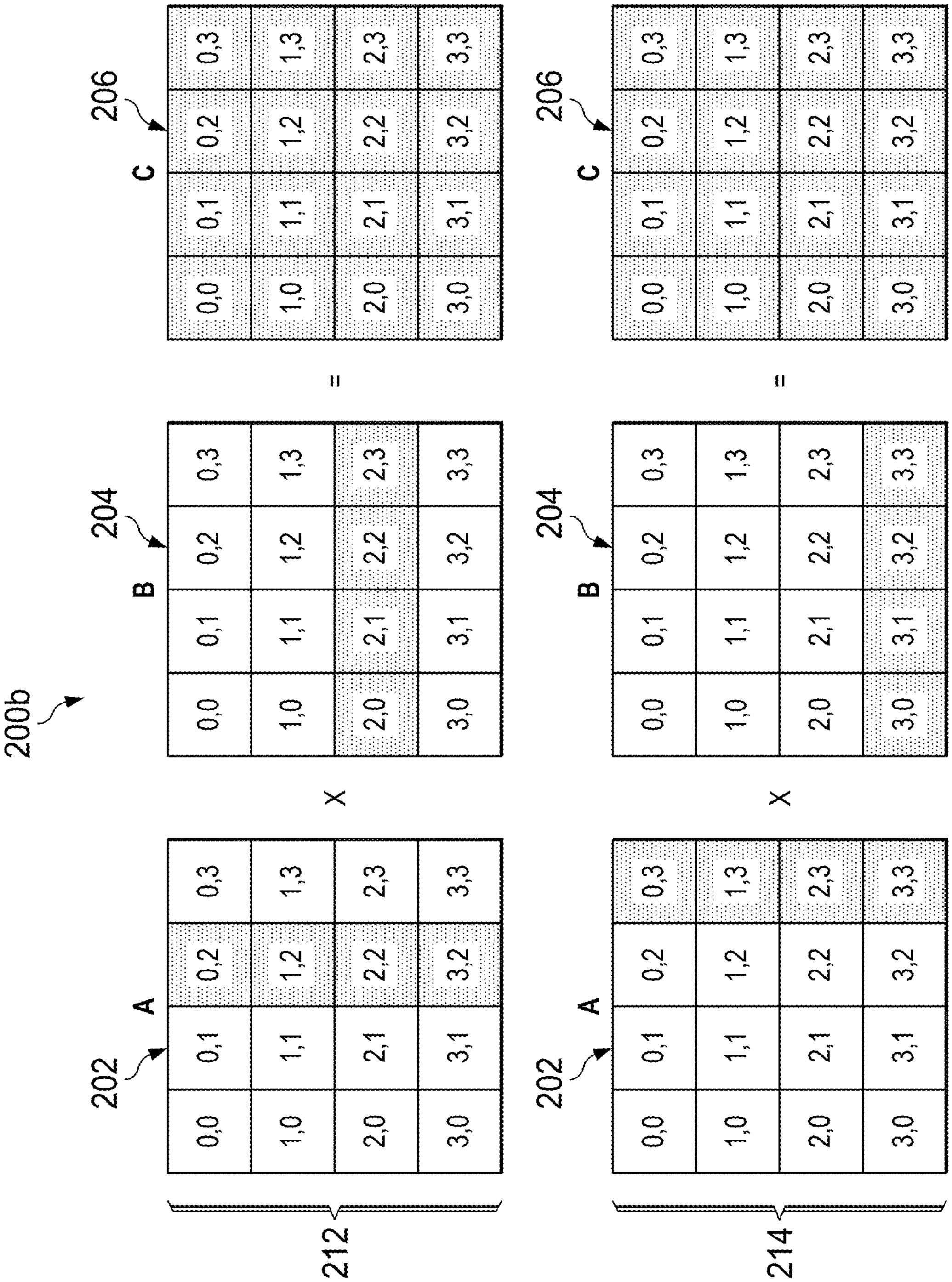

FIGS. 2A and 2B are an example outer product process 200 for multiplying two matrices. FIG. 2A is a first portion 200*a* of the process 200, and FIG. 2B is a second portion 200*b* of the process 200. A first matrix (matrix A) 202 is multiplied by a second matrix (matrix B) 204 to generate a third matrix (matrix C) 206. Let i be an integer (an iterator). Each element in an $i^{th}$ column of matrix A 202 is multiplied by each element in an $i^{th}$ row of matrix B 204 to generate a partial product added to (accumulated into) a corresponding element of matrix C 206.

Accordingly, these partial products are progressively accumulated as i is iterated to generate a complete product matrix C 206.

For example, consider the outer product of column 3 of matrix A 202 and row 3 of matrix B 204. A(0,3)×B(3,0) gives a partial product in C(0,0). Similarly, A(2,3)×B(3,1) gives a partial product in C(2,1). For column i of matrix A 202 and row i of matrix B 204, the partial product contributed to element (x, y) of matrix C 206 is given by Equation 2.

$$A(x,i)\times B(i,y)=\text{partial}(C(x,y)) \quad \text{Equation 2}$$

Accordingly, each combination of an $i^{th}$ column of matrix A 202 and an $i^{th}$ row of matrix B 204 enables generation of a partial product accumulated in each element of matrix C 206. Sequentially, i=0 is shown in step 208, i=1 is shown in step 210, i=2 is shown in step 212, and i=3 is shown in step 214. If the partial products generated in step 208 are C1, in step 210 are C2, in step 212 are C3, and in step 214 are C4, then C=C1+C2+C3+C4. The value of element C(x,y), for matrices A and B 202 and 204 of dimensions N×N, is shown in Equation 3.

$$\sum_{i=0}^{N-1} A(x,i)\times B(i,y)=C(x,y) \quad \text{Equation 3}$$

Figure 3:
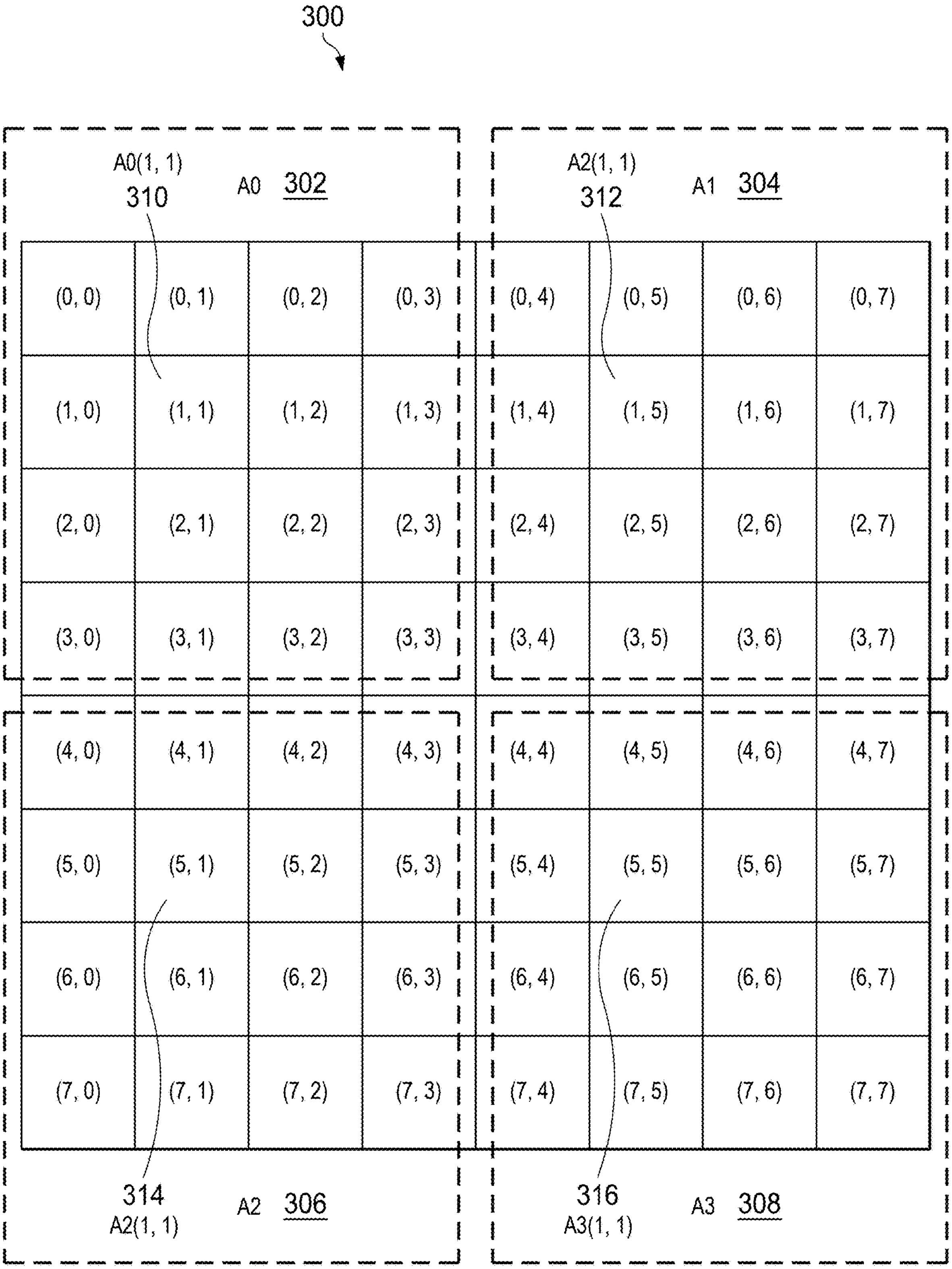
FIG. 3 is an example matrix divided into submatrices. The matrix has eight rows and eight columns.

FIG. 3 is an example matrix 300 divided into submatrices. The matrix 300 has eight rows and eight columns. The upper left quadrant of the matrix 300, corresponding to rows zero through three and columns zero through three, is referred to as submatrix 0 302. The upper right quadrant of the matrix 300, corresponding to rows zero through three and columns four through seven, is referred to as submatrix 1 304. The lower left quadrant of the matrix 300, corresponding to rows four through seven and columns zero through three, is referred to as submatrix 2 306. The lower right quadrant of the matrix 300, corresponding to rows four through seven and columns four through seven, is referred to as submatrix 3 308.

In an example, the matrix 300 is matrix A 300. Submatrix 0 302 is referred to as A0 302, submatrix 1 304 is referred to as A1 304, etc. References are used corresponding to positioning within a submatrix, rather than the overall matrix 300. For example, row 1, column 1 of A0 302 is (1, 1) 310 of matrix A 300, and is referred to as A0(1, 1) 310. Row 1, column 1 of A1 304 is (1, 5) 312 of matrix A 300, and is referred to as A1(1, 1) 312. Row 1, column 1 of A2 306 is (5, 1) 314 of matrix A 300, and is referred to as A2(1, 1) 314. Row 1, column 1 of A3 308 is (5, 5) 316 of matrix A 300, and is referred to as A3(1, 1) 316.

Figure 4:
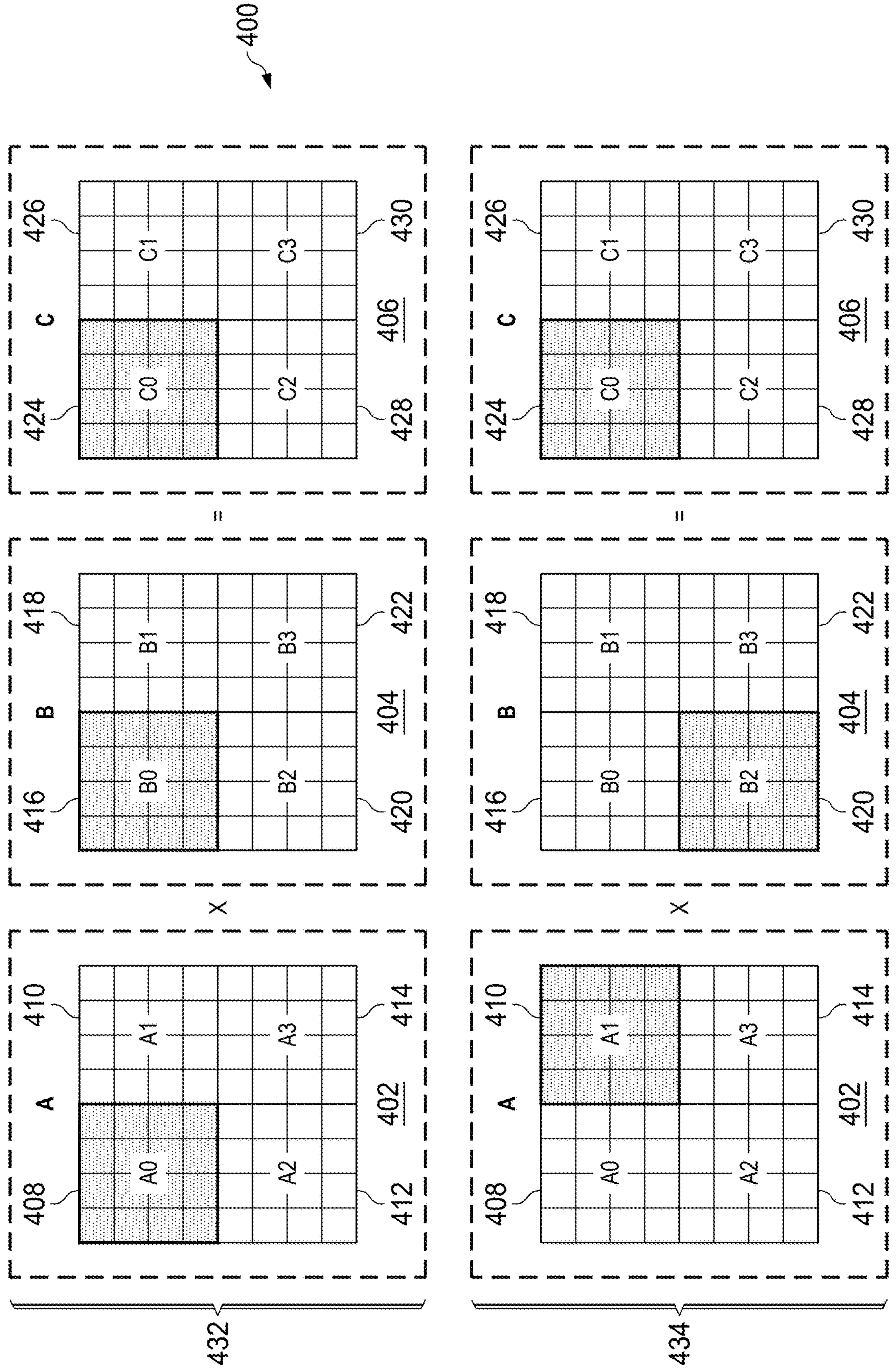
FIG. 4 is an example process for determining a product of two matrices as a sum of products of submatrices.

FIG. 4 is an example process 400 for determining a product of two matrices as a sum of products of submatrices. The process 400 is described with reference to the matrix 300 of FIG. 3. In some examples, products of submatrices are used to determine products of matrices that contain the submatrices if the input and/or output matrices are relatively large. In an example, a matrix is relatively large if the matrix does not fit within a memory (such as a register bank) for storing multiplicand matrices, or if such a memory into which the matrix would fit would exceed corresponding device area constraints. In some examples, other design considerations may determine that a matrix is relatively large and should be divided.

Matrix A 402, which has dimensions 8χ8, is divided into four 4χ4 submatrices A0 408, A1 410, A2 412, and A3 414. Matrix B 404, which has dimensions 8×8, is divided into four 4×4 submatrices B0 416, B1 418, B2 420, and B3 422. Matrix C 406, which has dimensions 8×8, is divided into four 4×4 submatrices C0 424, C1 426, C2 428, and C3 430.

According to the process 400, matrix C 406 equals the product of matrix A 402 with matrix B 404. In step 432, A0 408 is multiplied by B0 416 to generate a first set of partial products constituting C0 424. In step 434, A1 410 is multiplied by B2 420 to generate a second set of partial products constituting C0 424. The two sets of partial products generated in steps 432 and 434, added together, provide a completed C0 424. Similarly, A0×B0+A1×B2=C0, A0×B1+A1×B3=C1, A2×B0+A3×B2=C2, and A2×B1+A3×B3=C3.

Note that each pair of submatrices of matrix A 402 used to form a submatrix of matrix C 406 corresponds to complete rows of matrix A 402. Also, each pair of submatrices of matrix B 404 used to form a submatrix of matrix C 406 corresponds to complete columns of matrix B 404. This process 400 is applicable to both inner product and outer product approaches.

In some examples, contents of a matrix are stored in memory (a memory other than foreground or background registers) so that a row of elements of the matrix (or of a submatrix) are stored in a row of memory. In some examples, a row of memory can be read in one clock cycle of a system clock (such as clock 510, FIG. 5), so that a row of elements of the matrix (or submatrix) can be read in one clock cycle. Herein, foreground registers are registers that are used in calculation. Background registers are placeholder registers used to hold data: either a multiplicand submatrix transitioning from memory to foreground registers for use in calculation, or a result submatrix transitioning from foreground registers to memory for storage.

An example implementation of the inner product process 100 of FIGS. 1A and 1B will be described with respect to submatrices as described with respect to FIGS. 3 and 4. A row of submatrix B0 416 is read from memory and then loaded into a background bank of registers one row at a time. Once submatrix B0 416 is fully loaded into the background bank of registers, the following numbered actions are performed contemporaneously, such as within a single system clock cycle. (1) Submatrix B0 416 is swapped into a foreground bank of registers. (2) A row of submatrix A0 408 is loaded into a foreground row of registers. (3) Each column of submatrix B0 416 is multiplied by the row of submatrix A0 408 to generate a first set of partial products in a row of submatrix C0 424 (in another set of foreground registers).

In sequentially subsequent clock cycles, successive rows of submatrix A0 408 are loaded into the foreground row of registers (and may overwrite a previous value therein) and multiplied by submatrix B0 416 to generate partial products in successive rows of submatrix C0 424, while rows of submatrix B2 420 are successively loaded into rows of the background bank of registers. Once the A0×B0 multiplication is complete, the process is repeated, including swapping submatrix B2 420 into the foreground bank of registers, loading successive rows of submatrix A1 410 into the foreground row of registers, and an A1×B2 multiplication is performed to complete generation of submatrix C0 424. Rows of C0 424 are read out and stored to memory as they are completed. Meanwhile, rows of B0 416 are loaded into the background bank of registers to enable submatrix multiplication to generate submatrix C1 426. The process repeats for all different combinations of submatrices until matrix C 406 is completed.

In some examples, elements of the C matrix that are read out are further processed before they are stored to memory. For example, a value of an element of the C matrix that has a bit width larger than a corresponding memory location may be saturated (or clamped) so that it will fit within the memory location. In an example, locations in a memory store 8-bit values. Accordingly, an A matrix and a B matrix each includes 8-bit elements, so that a product of an A matrix element and a B matrix element is a 16-bit value. A plurality of these 16-bit values is summed to form a partial product that is added to (accumulated into) a corresponding C matrix element. In the example, C matrix elements are stored as 32-bit values to enable accumulating many 16-bit values accurately without overflowing. The 32-bit C matrix elements are processed after being read out to enable storing C matrix elements in corresponding 8-bit wide memory locations.

A similar example implementation of the outer product process 200 of FIGS. 2A and 2B performs an outer product of a column of a submatrix of matrix A 402 and a row of a submatrix of matrix B 404 at a time (such as in a single clock cycle) to generate partial products for an entire submatrix of matrix C 406. Accordingly, all elements in the submatrix of matrix C 406 are completed in the same clock cycle. Columns of submatrices of matrix A 402 and rows of submatrices of matrix B 404 are each loaded into a row of foreground registers during use, and the submatrix of matrix C 406 is stored in a foreground bank of registers. Responsive to row-per-cycle memory access (read and write) limitations as described above, the completed submatrix of matrix C 406 is swapped to a background bank of registers so that it can be read out and stored to memory in parallel with a next submatrix of matrix C 406 being generated.

In some examples, swapping a submatrix between groups of registers (such as between a bank of foreground registers and a bank of background registers) as described above can cause a spike in power usage by corresponding circuits involved in the transfer of data. In some examples, such power spikes can reduce stability of memory circuits or other circuits. Instability responsive to a power spike may lead to invalid or erroneous memory contents, or invalid or erroneous signals that may cause malfunction and/or erroneous results and/or output.

Figure 9:
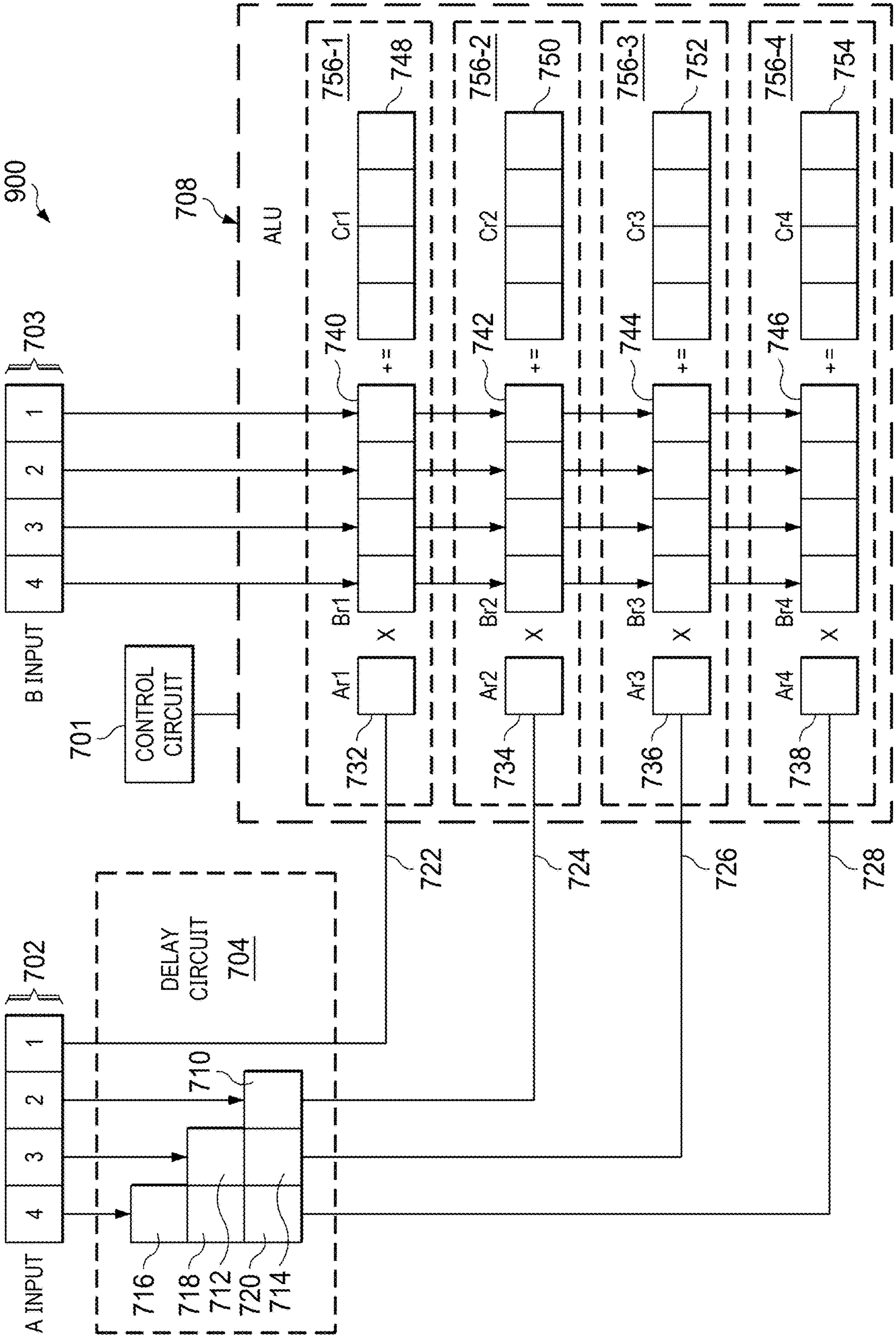
FIG. 9 is an example functional block diagram of an example MMA enabling an outer product version of the process of FIG. 6.
Figure 11:
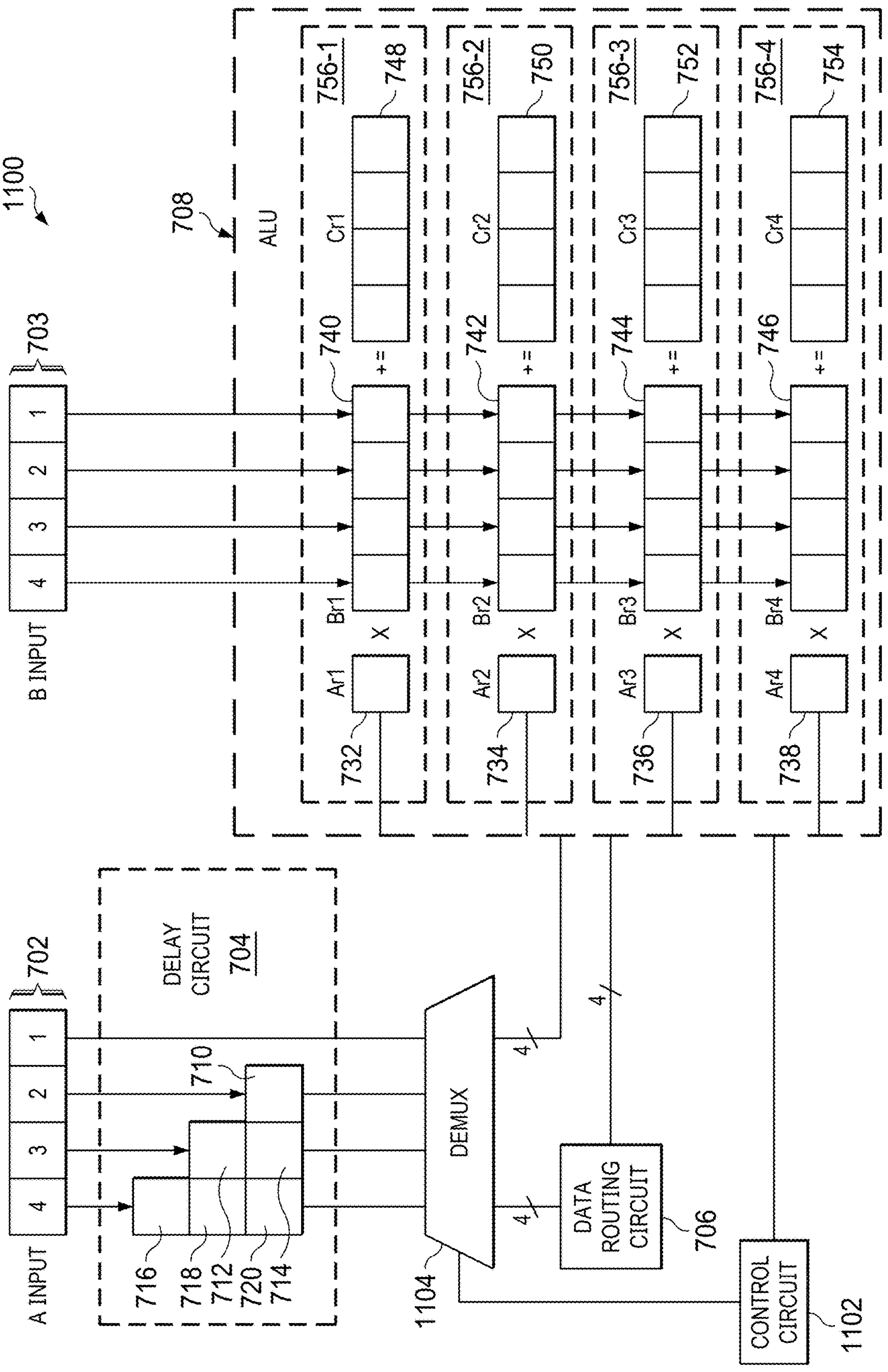
FIG. 11 is an example functional block diagram of an example MMA enabling selection between the inner product process described with respect to FIGS. 6A through 6D and 8A through 8D, and the outer product process described with respect to FIGS. 10A through 10D.

Structures and processes described with respect to FIGS. 7, 9, and 11 enable rearranging timing of certain aspects of inner product-type or outer product-type matrix multiplication to avoid use of background registers and/or to avoid swapping submatrices between groups of registers. Accordingly, the described structures and processes enable some or all of various benefits. These benefits may include reduction in device area cost, reduction in power supply area cost, reduction in power supply complexity, reduction in power supply design cost, increase in memory stability, or increase in circuit stability. These and other benefits are further described below.

Figure 5:
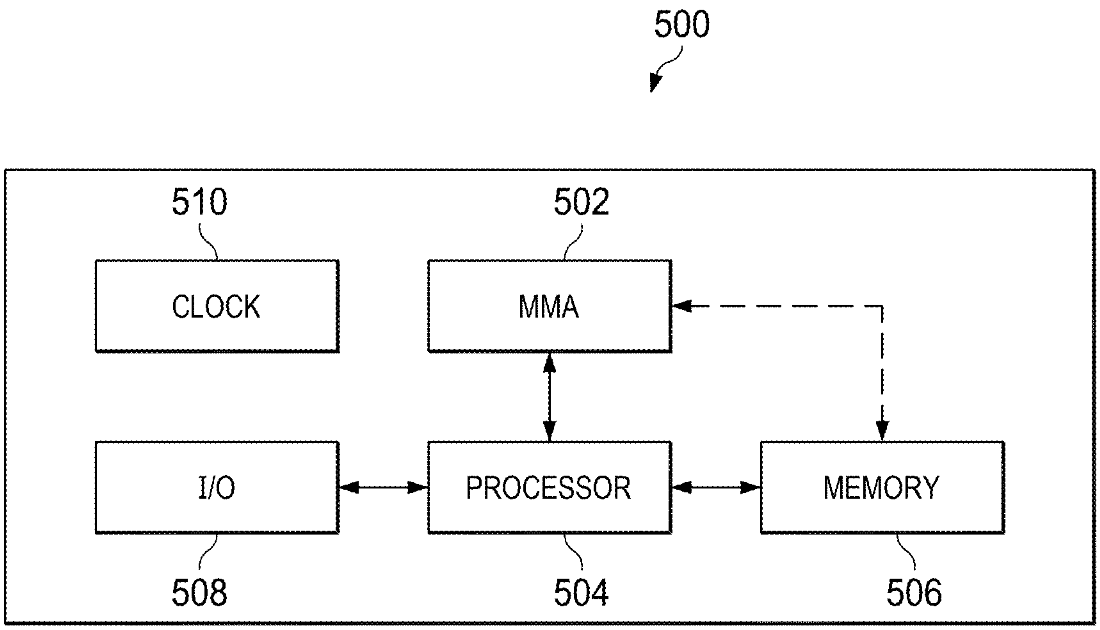
FIG. 5 is a functional block diagram of an example system-on-a-chip (SoC) that includes an MMA.

FIG. 5 is a functional block diagram of an example system-on-a-chip (SoC) 500 that includes an MMA 502. The SoC 500 also includes a processor 504, a memory 506, an input/output (I/O) block 508, and a system clock (clock) 510. The processor 504 is communicatively coupled to each of the MMA 502, the memory 506, and the I/O block 508. In some examples, the memory 506 is communicatively coupled to the MMA 502. The clock 510 is configured to clock the MMA 502, the processor 504, the memory 506, and the I/O block 508.

FIGS. 6A, 6B, 6C, and 6D are a second example inner product process 600 for multiplying two matrices. A first portion 600*a* of the process 600 is described with respect to FIG. 6A. A second portion 600*b* of the process 600 is described with respect to FIG. 6B, in continuation from FIG. 6A. A third portion 600*c* of the process 600 is described with respect to FIG. 6C, in continuation from FIG. 6B. A fourth portion 600*d* of the process 600 is described with respect to FIG. 6D, in continuation from FIG. 6C and as an alternative to the third portion 600*c*.

Figure 7A:
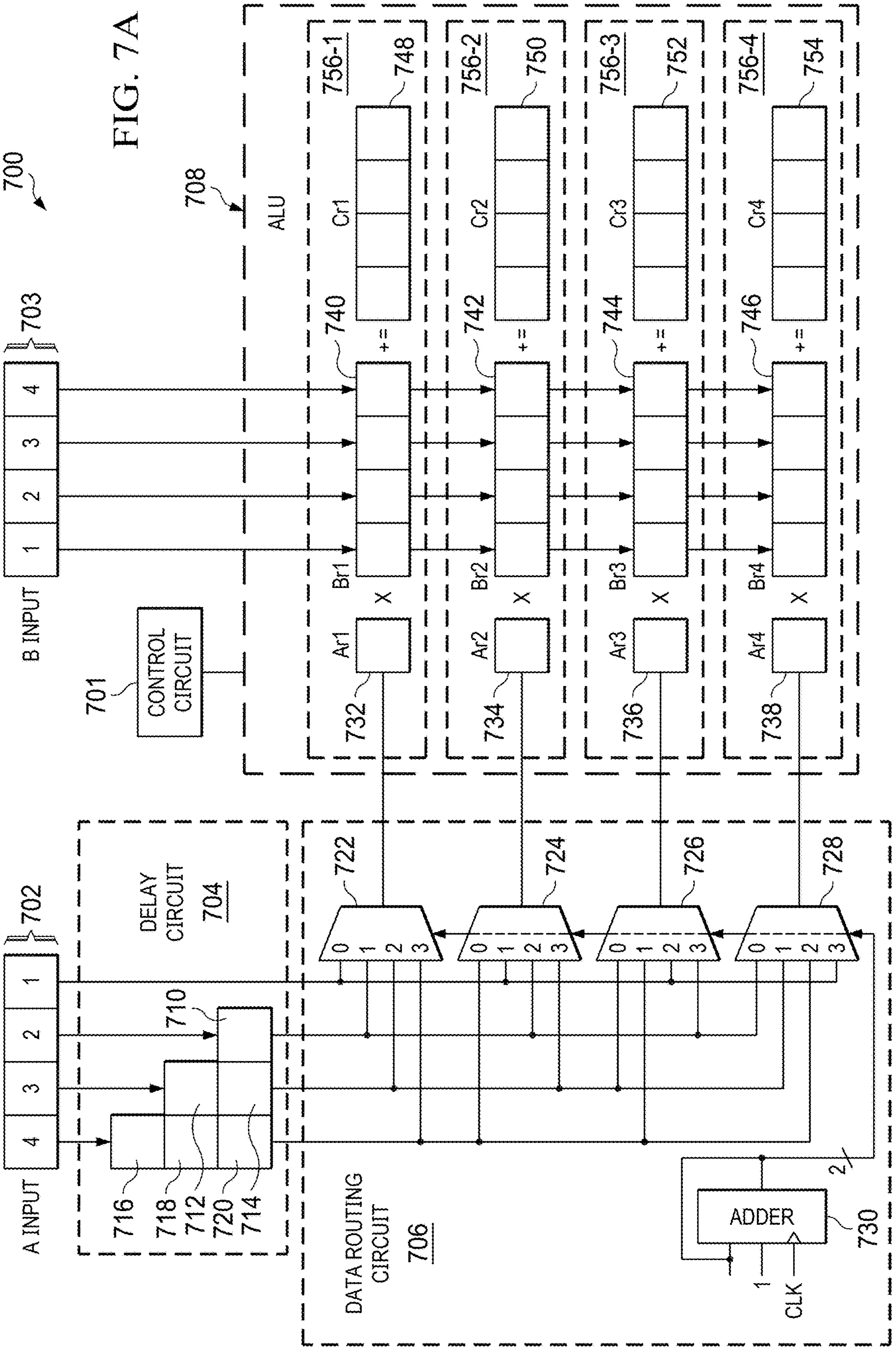
FIGS. 7A and 7B is an example functional block diagram of an example MMA enabling the inner product process of FIGS. 6A through 6D.
Figure 7B:
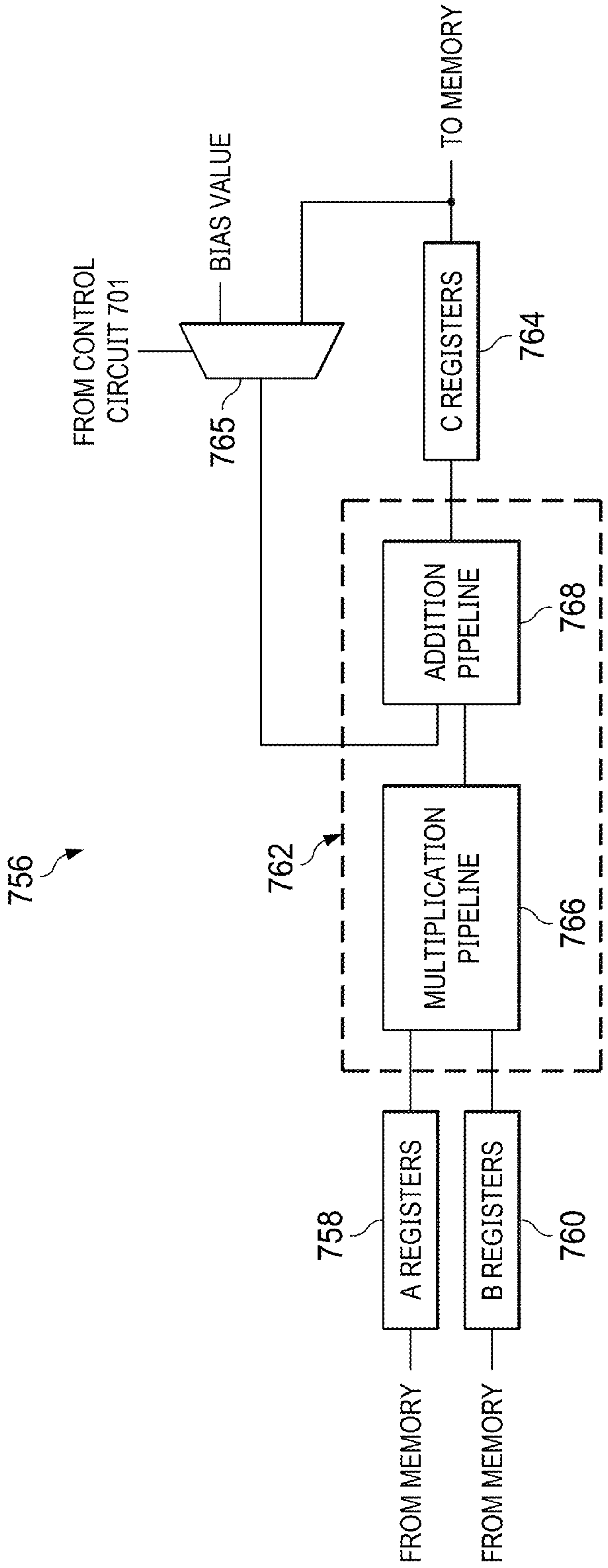

An example MMA 700 enabling the inner product process 600 is described with respect to FIGS. 7A and 7B. An implementation of inner product process 600 using the MMA 700 is described with respect to FIGS. 8A through 8D. An example MMA 900 enabling an outer product process with similar data flow to the inner product process 600 is described with respect to FIG. 9. The outer product process for multiplying two matrices using the MMA 900 is described with respect to FIGS. 10A through 10D.

In some examples, each step in the process 600 corresponds to a cycle of a system clock such as the clock 510. The process 600 is illustrated using matrix A 602, matrix B 604, and matrix C 606. In FIGS. 6A, 6B, 6C, and 6D, like hatch or dotting marks (pattern marks) in matrices A, B, and C 602, 604, and 606 as illustrated indicate an element of matrix A 602 that is multiplied by a corresponding (like pattern mark) row of matrix B 604 to generate partial products in a corresponding (like pattern mark) row of matrix C 606. The process 600 will initially be summarized, and then will be described stepwise.

In an example, multiplying an element of a first matrix by a row of a second matrix corresponds to multiplying the element of the first matrix by each element of the row to generate partial products in corresponding elements of a row of the product matrix. In the process 600, a first element of a first row of matrix A 602 is multiplied by a first row of matrix B 604, then a second element of the first row of matrix A 602 is multiplied by a second row of matrix B 604, etc., in sequentially successive steps. Similarly, a first element of a second row of matrix A 602 is multiplied by the first row of matrix B 604, then a second element of the second row of matrix A 602 is multiplied by the first row of matrix B 604, etc., starting one step later than for the first row of matrix A 602. Accordingly, elements of rows of matrix A 602 and rows of matrix B 604 are used in a pattern similar to a musical round, in which performers play the same melody but start at different intervals (for example, "row, row, row, your boat").

In the process 100 described above, a row of matrix A 102 is multiplied by an entire matrix B 104 in a single cycle. In contrast, the process 600 enables separating row-times-matrix multiplication into multiple element-times-row multiplications by multiplying an element of matrix A 602 by one element from each column of matrix B 604. These element-times-row multiplications can be performed in parallel for elements of matrix A 602 corresponding to different rows of matrix B 604. This enables reading in (loading) one row of matrix A 602 and one row of matrix B 604 at a time, and reading out (storing) one row of matrix C 606 at a time.

Figure 6A:
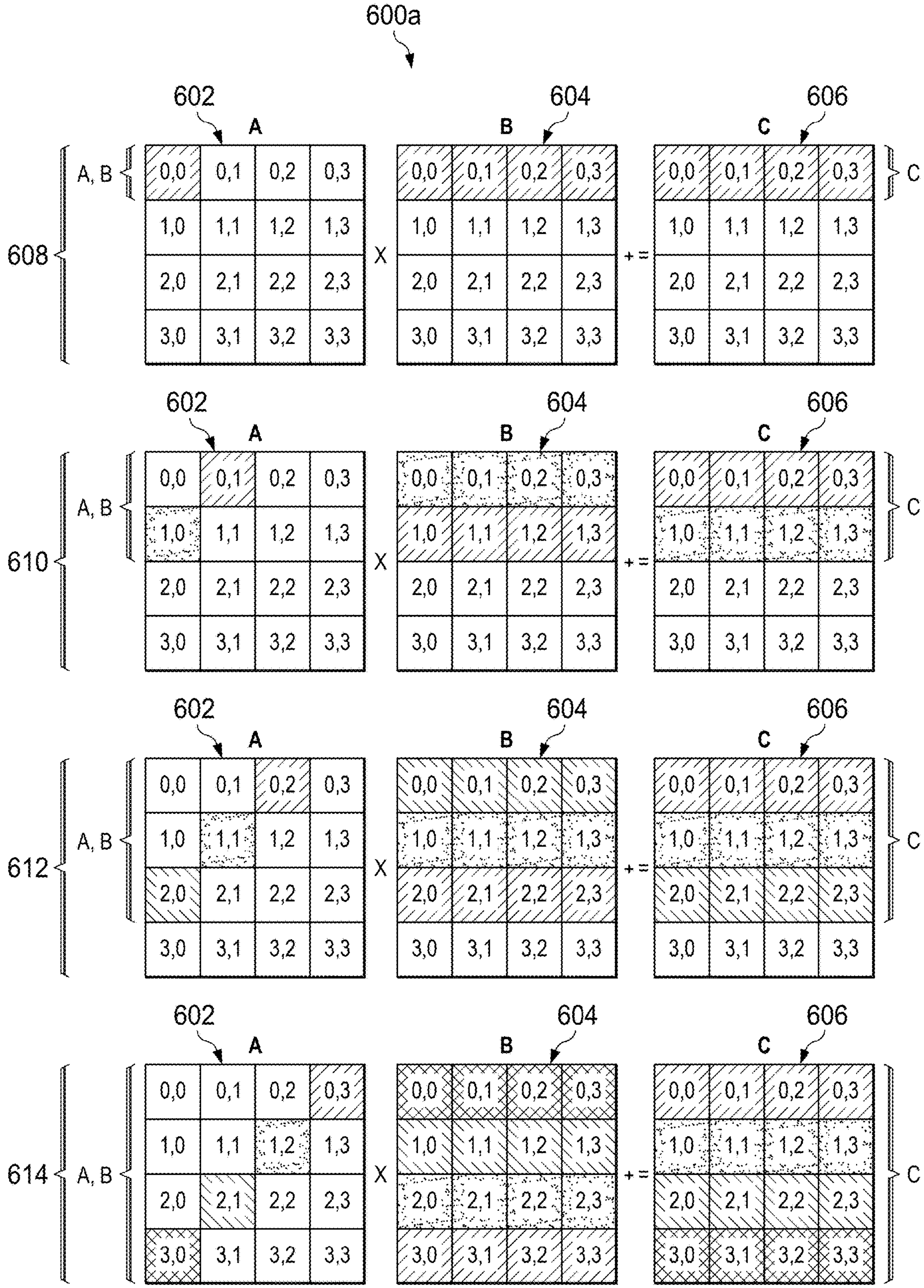
FIGS. 6A through 6D are a second example inner product process for multiplying two matrices.
Figure 6B:
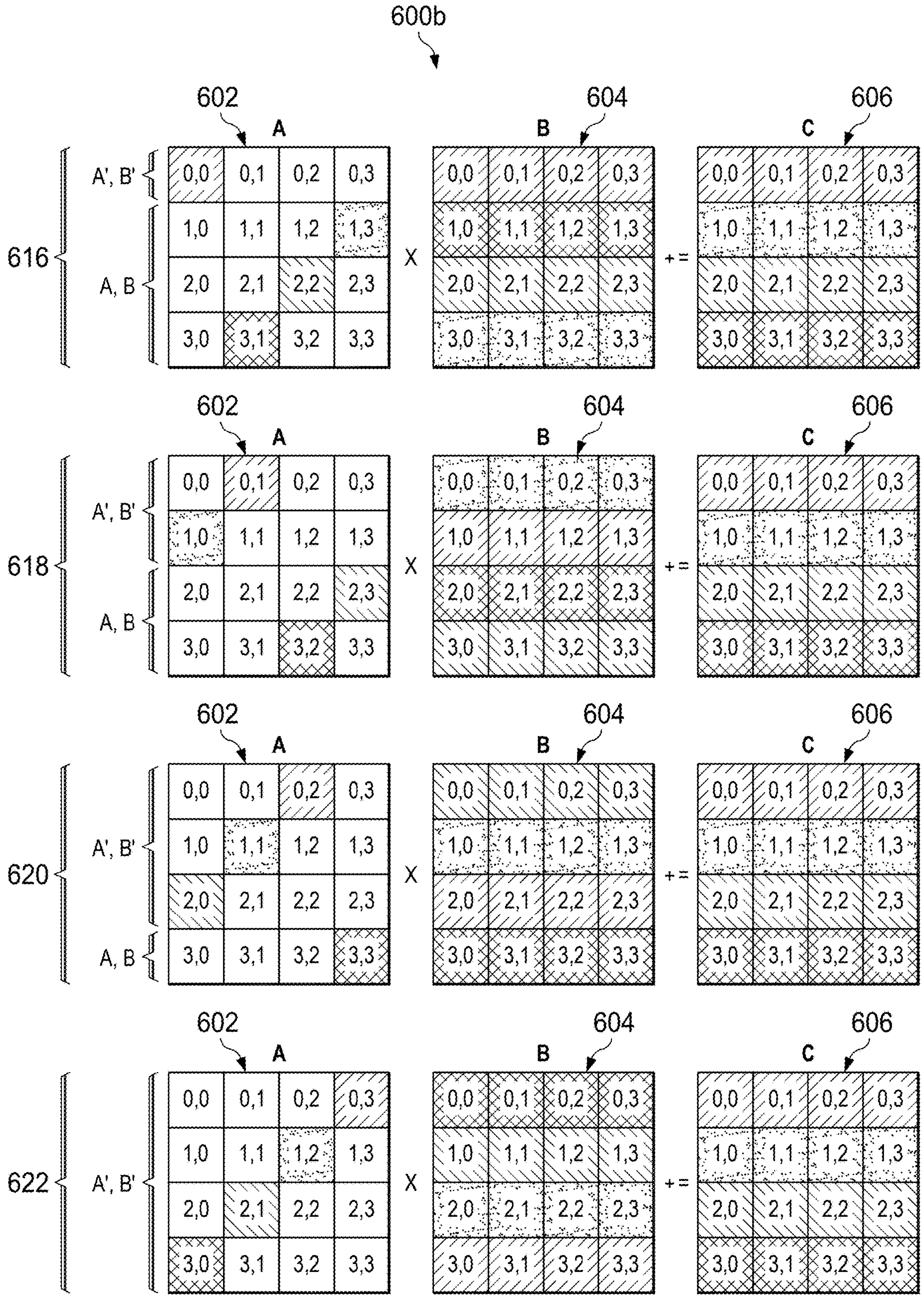
Figure 6C:
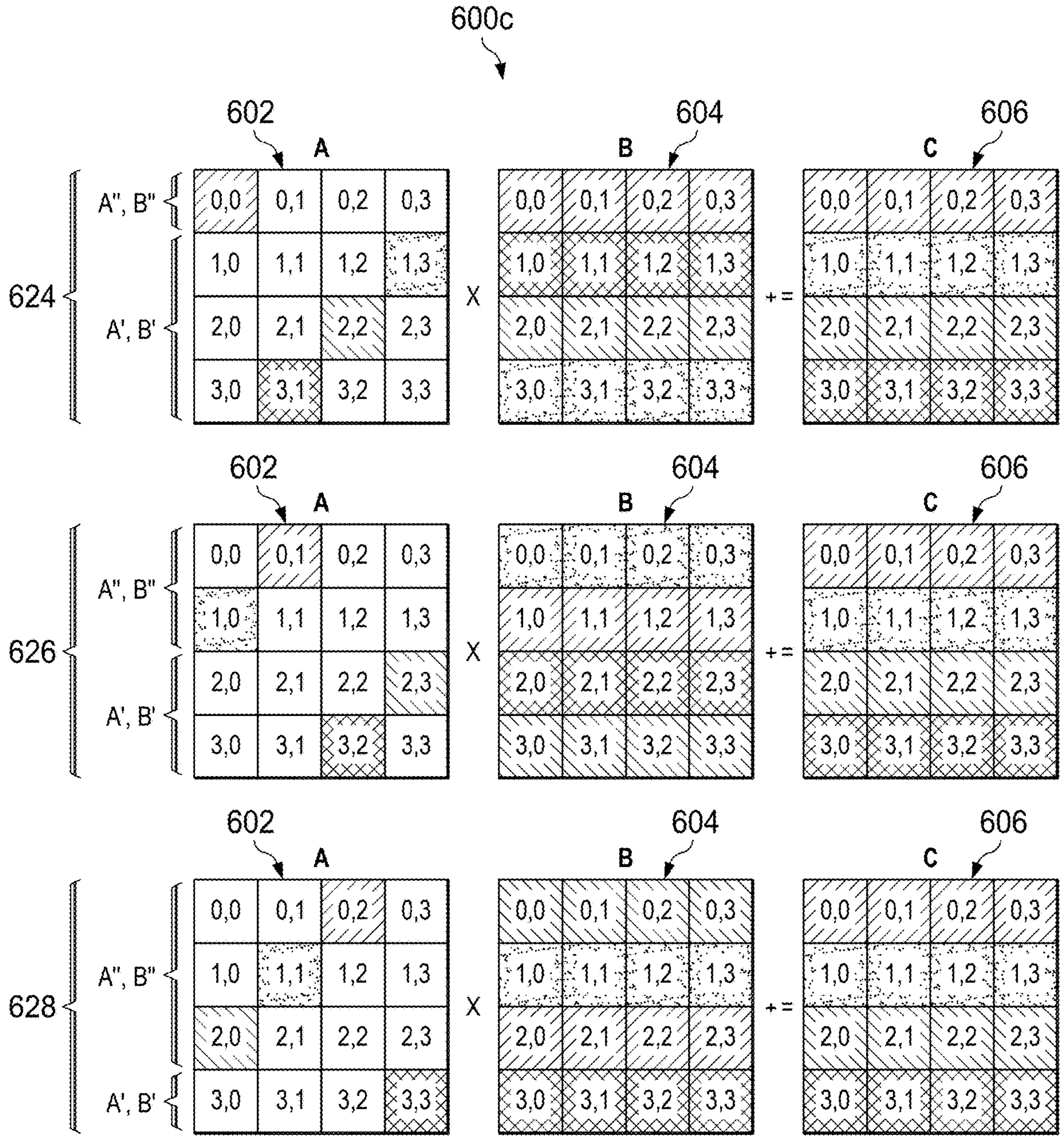
Figure 6D:
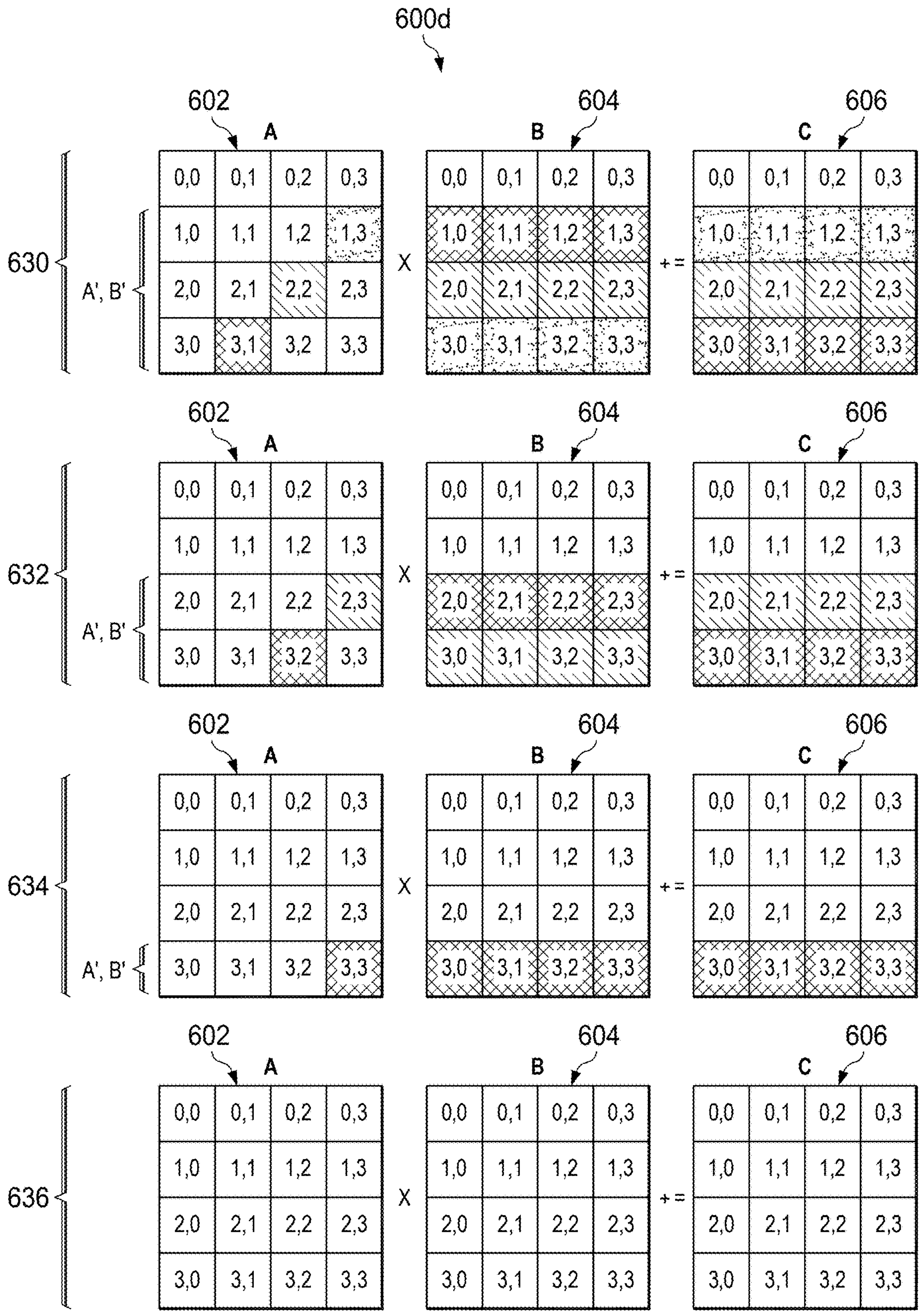

Referring to FIG. 6A, in step 608, A(0,0) is multiplied by the first row of matrix B 604 to generate partial products in the first row of matrix C 606.

In step 610, A(0,1) is multiplied by the second row of matrix B 604 to generate partial products accumulated into the first row of matrix C 606, and A(1,0) is multiplied by the first row of matrix B 604 to generate partial products in the second row of matrix C 606.

In step 612, A(0,2) is multiplied by the third row of matrix B 604 to generate partial products in the first row of matrix C 606, A(1,1) is multiplied by the second row of matrix B 604 to generate partial products accumulated into the second row of matrix C 606, and A(2,0) is multiplied by the first row of matrix B 604 to generate partial products in the third row of matrix C 606.

In step 614, A(0,3) is multiplied by the fourth row of matrix B 604 to generate partial products accumulated into the first row of matrix C 606, A(1,2) is multiplied by the third row of matrix B 604 to generate partial products accumulated into the second row of matrix C 606, A(2,1) is multiplied by the second row of matrix B 604 to generate partial products accumulated into the third row of matrix C 606, and A(3,0) is multiplied by the first row of matrix B 604 to generate partial products in the fourth row of matrix C 606.

Steps 616 through 628 correspond to steady state operation of the process 600 (after a beginning portion, when product matrix registers are initially filling, and before an ending portion, when product matrix registers are emptying without replacement). In step 616, elements of a new matrix A 602, referred to herein as A' (A prime), and rows of a new matrix B 604, referred to as B' (B prime), start to be loaded in to be multiplied. In some examples, the initial matrix A 602 is a first submatrix of a larger matrix A, similar to A 402, and A' 602 is a second submatrix of the larger matrix A. In some examples, the initial matrix B 604 is a first submatrix of a larger matrix B, and B' 604 is a second submatrix of the larger matrix B.

In some examples, after multiplying a row of a submatrix of A (such as A 602) by a submatrix of B (such as B 604), a corresponding row of a submatrix of C (such as C 606) will be completed. This enables read out for storage of the completed row of the submatrix of C, and the start of generation of a row of a next submatrix of C. A submatrix of C following C 606 is referred to herein as C' 606 (C prime). In some examples, in a step in which a first element of a row of a next submatrix of A (such as A' 602) is loaded in for multiplication, a completed row of C (a row of C 606) is read out for storage, so that the row of A' 602 can be multiplied by B' 604 to generate partial products in a corresponding row of C' 606.

In some examples, completion of multiplying a submatrix of A by a submatrix of B does not complete the current product submatrix of C. In such examples, multiplication of A' 602 by B' 604 continues to generate partial products of C 606, rather than C' 606. Steps 616 to 628 can be modified to correspond to this behavior by skipping the reading-out portion of said steps. In an example corresponding to this modification, matrix A 602 is A0 408, matrix A' 602 is A1 410, matrix B 604 is B0 416, and matrix B' 604 is B2 420.

In step 616, the first row of matrix C 606 is read out and stored to memory 506, A'(0,0) is multiplied by the first row of matrix B' 604 to generate partial products in the first row of matrix C' 606, A(1,3) is multiplied by the fourth row of matrix B 604 to generate partial products accumulated into the second row of matrix C 606, A(2,2) is multiplied by the third row of matrix B 604 to generate partial products accumulated into the third row of matrix C 606, and A(3,1) is multiplied by the second row of matrix B 604 to generate partial products accumulated into the fourth row of matrix C 606. Note that elements of matrix A 602 and rows of matrix B 604 are processed in parallel with processing of elements of matrix A' 602 and rows of matrix B' 604.

In step 618, A'(0,1) is multiplied by the second row of matrix B' 604 to generate partial products accumulated into the first row of matrix C' 606, the second row of matrix C 606 is read out and stored to memory 506, A'(1,0) is multiplied by the first row of matrix B' 604 to generate partial products in the second row of matrix C' 606, A(2,3) is multiplied by the fourth row of matrix B 604 to generate partial products accumulated into the third row of matrix C 606, and A(3,2) is multiplied by the third row of matrix B 604 to generate partial products accumulated into the fourth row of matrix C 606.

In step 620, A'(0,2) is multiplied by the third row of matrix B' 604 to generate partial products accumulated into the first row of matrix C' 606, A'(1,1) is multiplied by the second row of matrix B' 604 to generate partial products accumulated into the second row of matrix C' 606, the third row of matrix C 606 is read out and stored to memory 506, A'(2,0) is multiplied by the first row of matrix B' 604 to generate partial products in the third row of matrix C' 606, and A(3,3) is multiplied by the fourth row of matrix B 604 to generate partial products accumulated into the fourth row of matrix C 606.

In step 622, A'(0,3) is multiplied by the fourth row of matrix B' 604 to generate partial products accumulated into the first row of matrix C' 606, A'(1,2) is multiplied by the third row of matrix B' 604 to generate partial products accumulated into the second row of matrix C' 606, A'(2,1) is multiplied by the second row of matrix B 604 to generate partial products accumulated into the third row of matrix C 606, the fourth row of matrix C 606 is read out and stored to memory 506, and A'(3,0) is multiplied by the first row of matrix B' 604 to generate partial products in the fourth row of matrix C' 606.

Steps 624 through 628 (FIG. 6C) and steps 630 through 634 (FIG. 6D) are presented as alternatives. As described above, steps 624 through 628 continue a steady state period of the process 600. Steps 630 through 634 correspond to a winding-down and conclusion of the process 600 as no elements corresponding to new rows of matrix A 602, and no new rows of matrix B 604, are loaded in for multiplication.

In step 624, elements of a new matrix A 602, referred to herein as A" (A double-prime), and rows of a new matrix B 604, referred to as B" (B double-prime), start to be loaded in to be multiplied. In step 624, A"(0,0) is multiplied by the first row of matrix B" 604 to generate partial products accumulated into the first row of matrix C' 606, A'(1,3) is multiplied by the fourth row of matrix B' 604 to generate partial products accumulated into the second row of matrix C' 606, A'(2,2) is multiplied by the third row of matrix B' 604 to generate partial products accumulated into the third row of matrix C' 606, and A'(3,1) is multiplied by the second row of matrix B' 604 to generate partial products accumulated into the fourth row of matrix C' 606.

In step 626, A"(0,1) is multiplied by the second row of matrix B" 604 to generate partial products accumulated into the first row of matrix C' 606, A"(1,0) is multiplied by the first row of matrix B" 604 to generate partial products accumulated into the second row of matrix C' 606, A'(2,3) is multiplied by the fourth row of matrix B' 604 to generate partial products accumulated into the third row of matrix C' 606, and A'(3,2) is multiplied by the third row of matrix B' 604 to generate partial products accumulated into the fourth row of matrix C 606.

In step 628, A"(0,2) is multiplied by the third row of matrix B" 604 to generate partial products accumulated into the first row of matrix C' 606, A"(1,1) is multiplied by the second row of matrix B" 604 to generate partial products accumulated into the second row of matrix C' 606, A"(2,0) is multiplied by the first row of matrix B" 604 to generate partial products accumulated into the third row of matrix C' 606, and A'(3,3) is multiplied by the fourth row of matrix B' 604 to generate partial products accumulated into the fourth row of matrix C' 606.

In step 630, a first row of matrix C' 606 is read out and stored to memory 506, A'(1,3) is multiplied by the fourth row of matrix B' 604 to generate partial products accumulated into the second row of matrix C' 606, A'(2,2) is multiplied by the third row of matrix B' 604 to generate partial products accumulated into the third row of matrix C' 606, and A'(3,1) is multiplied by the second row of matrix B' 604 to generate partial products accumulated into the fourth row of matrix C' 606.

In step 632, the second row of matrix C' 606 is read out and stored to memory 506, A'(2,3) is multiplied by the fourth row of matrix B' 604 to generate partial products accumulated into the third row of matrix C' 606, and A'(3,2) is multiplied by the third row of matrix B' 604 to generate partial products accumulated into the fourth row of matrix C 606.

In step 634, the third row of matrix C' 606 is read out and stored to memory 506, and A'(3,3) is multiplied by the fourth row of matrix B' 604 to generate partial products accumulated into the fourth row of matrix C' 606. In step 636, the fourth row of matrix C' 606 is read out and stored to memory 506.

FIG. 7A is an example functional block diagram of an example MMA 700 enabling the inner product process 600 of FIGS. 6A through 6D. The MMA 700 is a first example implementation of the MMA 502 of FIG. 5. The MMA 700 includes a control circuit 701, an A input memory 702, a B input memory 703, a delay circuit 704, a data routing circuit 706, and an arithmetic logic unit (ALU) 708. The control circuit 701 is connected to control the ALU 708, as further described with respect to FIG. 7B. In some examples the A and/or B input memories 702 and 703 correspond to data signals received from the memory 506 (or other memory), rather than to memory within the MMA 502. In some examples, the A input memory 702, the B input memory 703, and delay elements in the delay circuit 704 (FIG. 7) can be described as background memory of the MMA 502.

The delay circuit 704 includes a first delay element 710, a second delay element 712, a third delay element 714, a fourth delay element 716, a fifth delay element 718, and a sixth delay element 720. In some examples, each of the delay elements 710, 712, 714, 716, 718, and 720 is a memory circuit for storing a matrix element, such as a register. The data routing circuit 706 includes a first multiplexer (MUX) 722, a second MUX 724, a third MUX 726, a fourth MUX 728, and an adder 730. The ALU 708 includes various registers and arithmetical functional blocks. Certain structure of the ALU 708 is described here. The ALU 708 is further described with respect to FIG. 7B.

The ALU 708 includes a first A element register (Ar1) 732 (a memory circuit for storing a matrix element), a second A element register (Ar2) 734, a third A element register (Ar3) 736, a fourth A element register (Ar4) 738, a first B row of registers (Br1) 740 (a memory circuit for storing a row of elements of a matrix or submatrix), a second B row of registers (Br2) 742, a third B row of registers (Br3) 744, a fourth B row of registers (Br4) 746, a first C row of registers (Cr1) 748, a second C row of registers (Cr2) 750, a third C row of registers (Cr3) 752, and a fourth C row of registers (Cr4) 754. In some examples, the A element registers 732, 734, 736, and 738, the B rows of registers 740, 742, 744, and 746, and the C rows of registers 748, 750, 752, and 754 can be described as foreground memory of the MMA 502.

Ar1 732, Br1 740, and Cr1 748 are included in a first slice 756-1 of the ALU 708. Ar2 734, Br2 742, and Cr2 750 are included in a second slice 756-2 of the ALU 708. Ar3 736, Br3 744, and Cr3 752 are included in a third slice 756-3 of the ALU 708. Ar4 738, Br4 746, and Cr4 754 are included in a fourth slice 756-4 of the ALU 708. The ALU 708 is further described with respect to FIG. 7B.

The example MMA 700 enables multiplication of two four-row, four-column (or smaller) matrices. Accordingly, the A input memory 702, the B input memory 703, the rows of registers in each of the slices 756 each include four memory elements, the MUXes 722, 724, 726, and 728 each have four data inputs and a two bit control input (two control inputs), and the adder 730 is a two bit adder 730. In some examples, the MMA 700 enables multiplication of larger or smaller matrices, and some or all of the above-described sizes are modified accordingly. In some examples, a memory element includes a number of flip-flops (such as D flip-flops) or other memory units corresponding to a number of binary bits in a number type (such as signed double precision floating point) to be stored by the memory element.

A clock input of the adder 730 receives a clock signal (CLK), such as from the system clock 510. The system clock 510 also clocks, for example, the A and B input memories 702 and 703, the delay circuit 704, and the memories of the ALU 708. A second input of the adder 730 receives a constant one, so that the adder will increment responsive to each cycle of CLK, such as responsive to a rising edge or falling edge of CLK. An output of the adder 730 is connected to a third input of the adder 730 for use as a reset, and to the control inputs of each of the MUXes 722, 724, 726, and 728. Accordingly, the adder 730 behaves as a counter modulo four, cyclically counting zero, one, two, three, zero, etc.

As described, each of the MUXes 722, 724, 726, and 728 includes first, second, third, and fourth inputs. The MUXes 722, 724, 726, and 728 are controlled to output their respective first inputs by a zero value (such as 00) of the adder 730 output. The MUXes 722, 724, 726, and 728 are controlled to output their respective second inputs by a one value (such as 01) of the adder 730 output. The MUXes 722, 724, 726, and 728 are controlled to output their respective third inputs by a two value (such as 10) of the adder 730 output. The MUXes 722, 724, 726, and 728 are controlled to output their respective fourth inputs by a three value (such as 11) of the adder 730 output. These correspondences are indicated by the numbers (0, 1, 2, 3) next to the inputs of the MUXes 722, 724, 726, and 728.

The elements of the A and B input memories 702 and 703 are referred to as the first, second, third, and fourth elements of the respective memory 702 or 703 according to the illustrated numbering (1, 2, 3, 4). The second element of the A input memory 702 is connected to the first delay element 710. The third element of the A input memory 702 is connected to the second delay element 712. The second delay element is connected to the third delay element 714. The fourth element of the A input memory 702 is connected to the fourth delay element 716. The fourth delay element 716 is connected to the fifth delay element 718. The fifth delay element is connected to the sixth delay element 720.

The first element of the A input memory 702 is connected to the first input of the first MUX 722, the second input of the second MUX 724, the third input of the third MUX 726, and the fourth input of the fourth MUX 728. The first delay element 710, corresponding to the second element of the A input memory 702, is connected to the second input of the first MUX 722, the third input of the second MUX 724, the fourth input of the third MUX 726, and the first input of the fourth MUX 728. The third delay element 714, corresponding to the third element of the A input memory 702, is connected to the third input of the first MUX 722, the fourth input of the second MUX 724, the first input of the third MUX 726, and the second input of the fourth MUX 728. The sixth delay element 720, corresponding to the fourth element of the A input memory 702, is connected to the fourth input of the first MUX 722, the first input of the second MUX 724, the second input of the third MUX 726, and the third input of the fourth MUX 728.

Values stored in the A input memory 702 or the delay elements 710, 712, 714, 716, 718, and 720 move downward one slot responsive to each cycle of CLK, such as responsive to a rising edge or falling edge of CLK. The first element of the A input memory 702 provides its stored value to the one of Ar1 732, Ar2 734, Ar3 736, or Ar4 738 specified by the MUXes 722, 724, 726, and 728 responsive to the control signal provided by the adder 730.

The second element of the A input memory 702 provides its stored value to the first delay element 710. The first delay element 710 provides its stored value to the one of Ar1 732, Ar2 734, Ar3 736, or Ar4 738 specified by the MUXes 722, 724, 726, and 728 responsive to the control signal provided by the adder 730.

The third element of the A input memory 702 provides its stored value to the second delay element 712. The second delay element provides its stored value to the third delay element 714. The third delay element 714 provides its stored value to the one of Ar1 732, Ar2 734, Ar3 736, or Ar4 738 specified by the MUXes 722, 724, 726, and 728 responsive to the control signal provided by the adder 730.

The fourth element of the A input memory 702 provides its stored value to the fourth delay element 716. The fourth delay element 716 provides its stored value to the fifth delay element 718. The fifth delay element 718 provides its stored value to the sixth delay element 720. The sixth delay element 720 provides its stored value to the one of Ar1 732, Ar2 734, Ar3 736, or Ar4 738 specified by the MUXes 722, 724, 726, and 728 responsive to the control signal provided by the adder 730.

Values stored in the B input memory 703 move downward one slot responsive to each cycle of CLK, such as responsive to a rising edge or falling edge of CLK. Accordingly, the elements of the B input memory 703 provide their stored values to corresponding elements of Br1 740. The elements of Br1 740 provide their stored values to corresponding elements of Br2 742. The elements of Br2 742 provide their stored values to corresponding elements of Br3 744. The elements of Br3 744 provide their stored values to corresponding elements of Br4 746.

After new values are applied to the various Ar and Br memory elements (732, 734, 736, 738, 740, 742, 744, and 746) of the ALU 708, the value stored by the Ar memory element (732, 734, 736, or 738) is multiplied by the values stored by the corresponding row of Br memory elements (740, 742, 744, or 746) to generate a set of partial products. These partial products are added to corresponding ones of a corresponding row of Cr memory elements (748, 750, 752, or 754).

An example application of the MMA 700 to implement the inner product process 600 of FIGS. 6A through 6D is described with respect to FIGS. 8A through 8D. An outer product process that uses the same data flow illustrated in FIGS. 10A through 10D.

FIG. 7B is a functional block diagram of a slice 756 of FIG. 7A. The slice 756 includes an A register 758, B registers 760, an arithmetic pipeline 762, C registers 764, and a MUX 765. The arithmetic pipeline 762 includes a multiplication pipeline 766 and an addition pipeline 768. The A register 758 corresponds to Ar1 732, Ar2 734, Ar3 736, or Ar4 738. The B registers 760 correspond to Br1 738, Br2 740, Br3 742, or Br4 744. The multiplication pipeline 766 corresponds to the multiplication signs in the MMA 700 as illustrated in FIG. 7A. The addition pipeline 768 and feedback from the C registers 764 (described below) corresponds to the combined addition and equals signs in the MMA 700 as illustrated in FIG. 7A.

The A register 758 receives A matrix element data from memory. The B registers 760 receive B matrix element data from memory. The A register 758 provides the A matrix element data to a first input of the multiplication pipeline 766. The B registers 760 provide the B matrix element data to a second input of the multiplication pipeline 766. The multiplication pipeline 766 provides products of the A matrix data with the B matrix data to a first input of the addition pipeline 768. The addition pipeline 768 outputs to the C registers 764.

The C registers 764 output to memory (such as the memory 506) and to a first input of the MUX 765. A second input of the MUX 765 receives a bias value, such as a zero value or other value to initialize values in the C registers 764. In some examples, there is a different and/or distinct bias value corresponding to each element in a C matrix (for example, corresponding to each C register 764 that represents a distinct element in the C matrix). In some examples, the bias values are provided by the memory 506.

A control input of the MUX 765 receives a control signal from the control circuit 701. An output of the MUX 765 is connected to a second input of the addition pipeline 768. In an example, the addition pipeline 768, the C registers 764, and the MUX 765 together correspond to N multiply-accumulate (MAC) nodes, where N is the length of the B rows.

After a row of a C matrix has been read out and stored to memory (such as the memory 506), the control circuit 701 controls the MUX 765 to output the bias value. This controls the C registers 764 to store the product of the contents of the A register 758 and the B registers 760, without adding the previous contents of the C registers 764. In an example, this corresponds to generating partial products for the first row of C' 606 in step 616 (FIG. 6), and generating partial products for the second row of C' 606 in step 618. In the example, the control circuit 701 controls the MUX 765 in the first slice 756-1 to provide the bias value in step 616. The control circuit 701 controls the MUX 765 in the second slice 756-2 to provide the bias value in step 618.

Figure 8A:
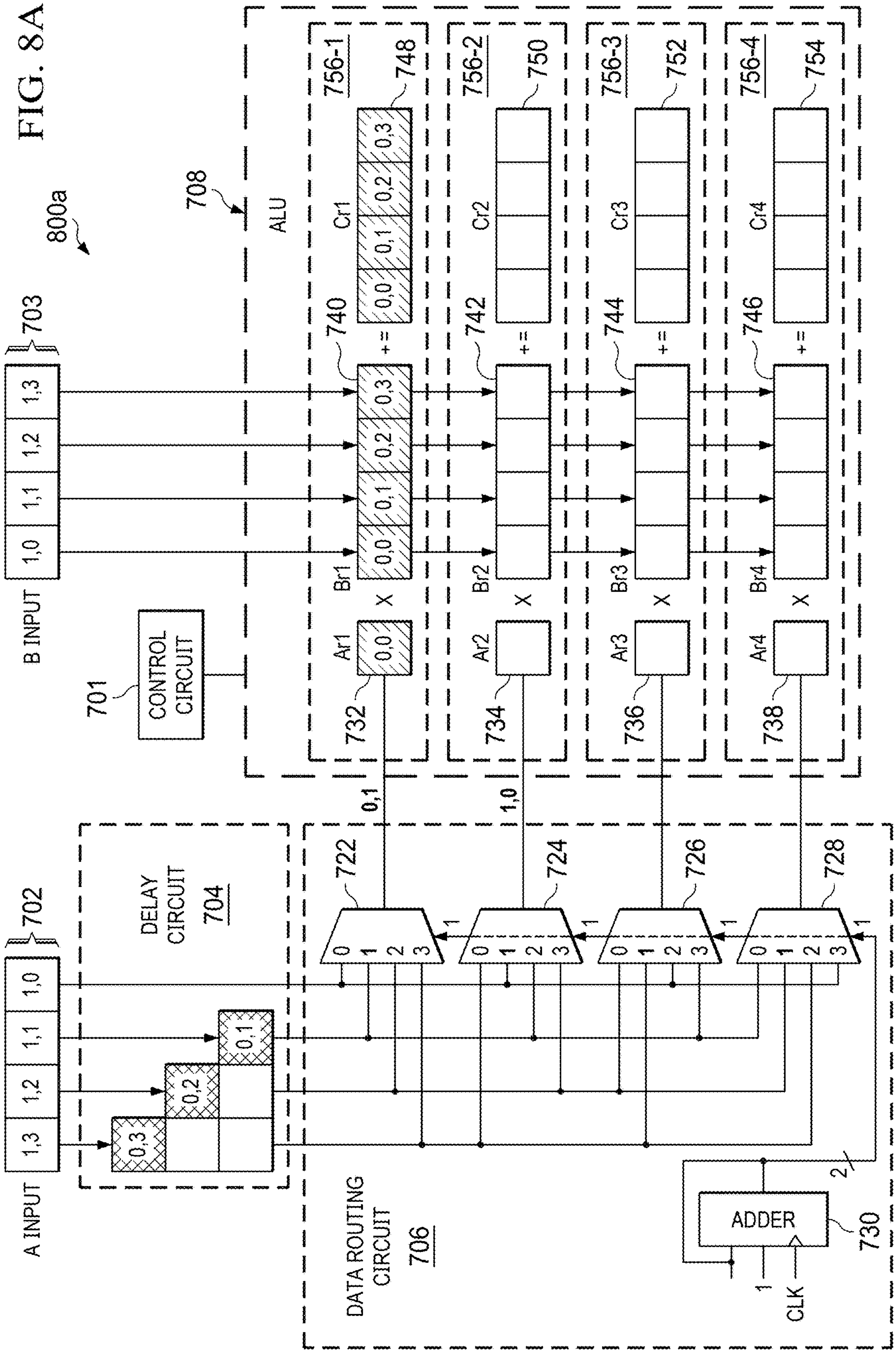
FIGS. 8A through 8D are functional block diagrams showing an example implementation of the process of FIGS. 6A through 6D using the MMA of FIG. 7A.
Figure 8B:
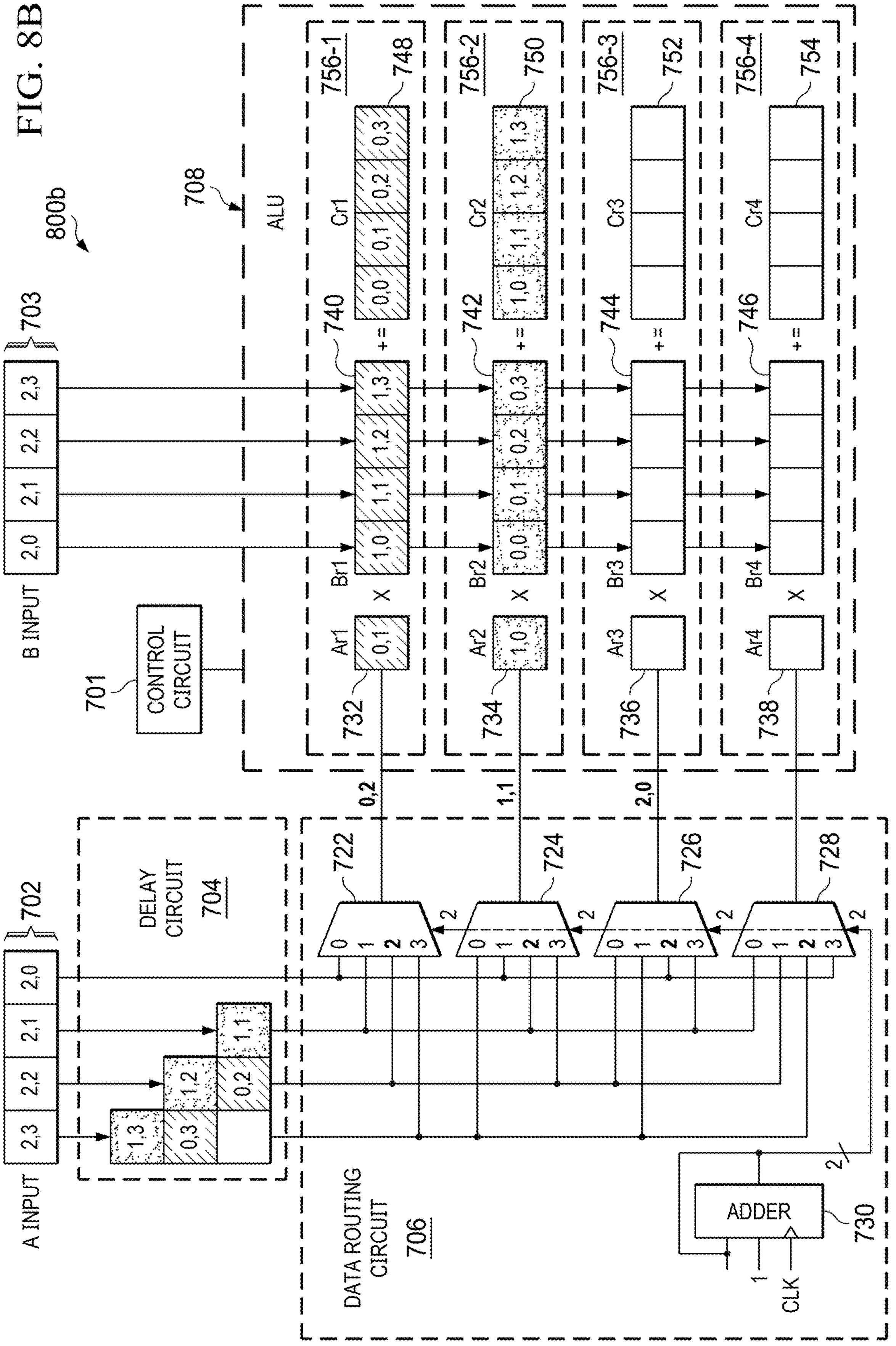
Figure 8C:
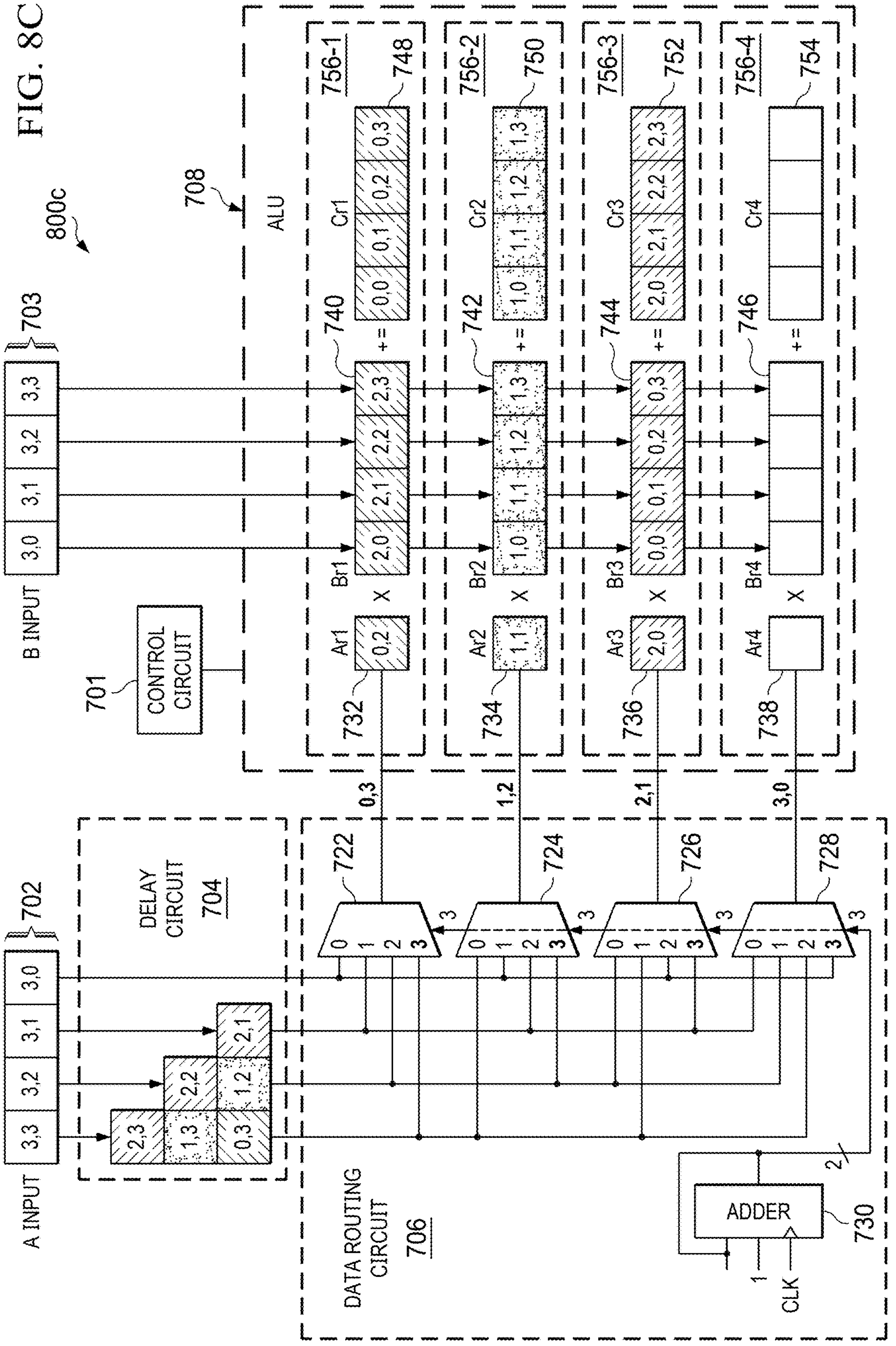
Figure 8D:
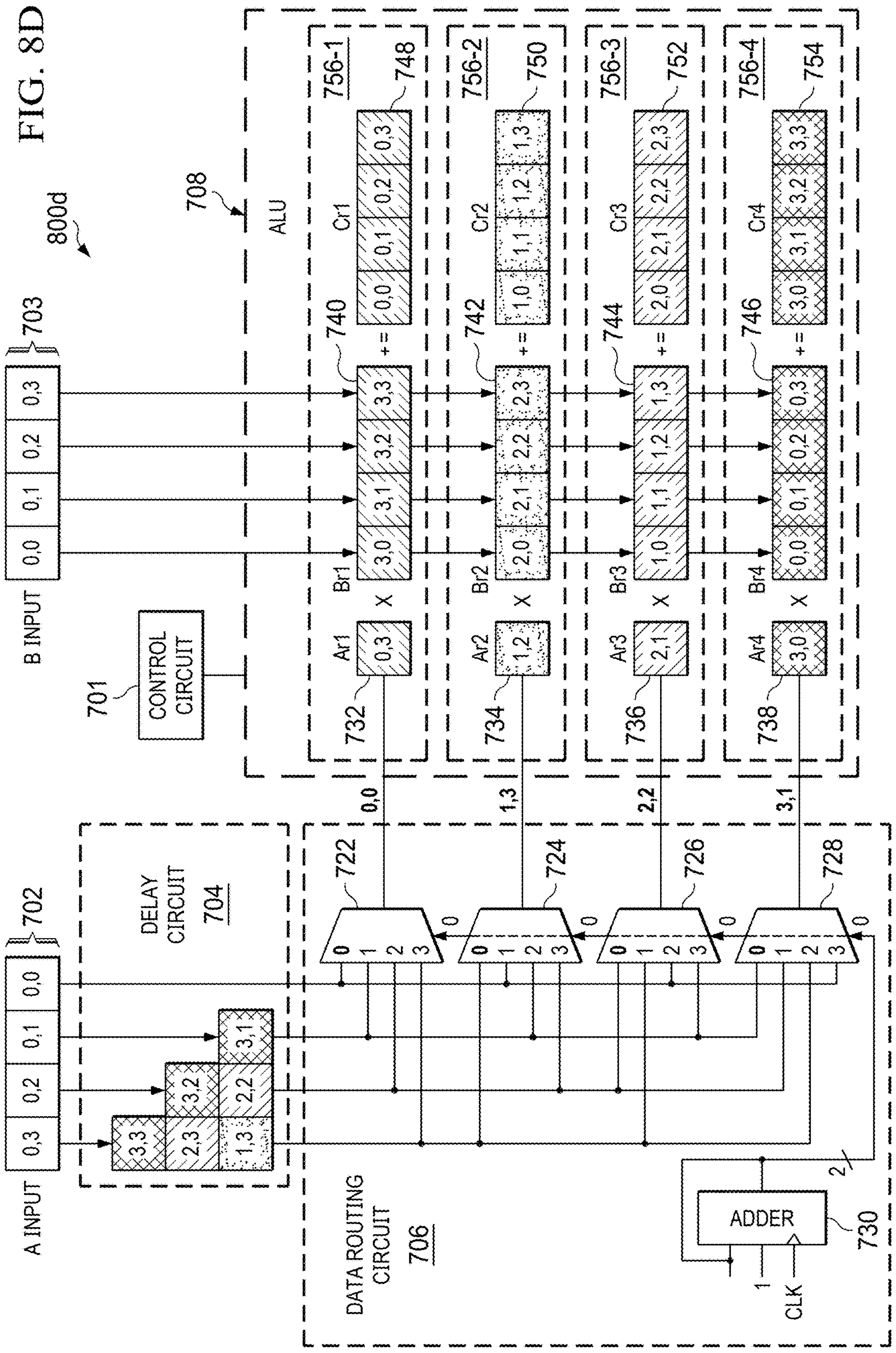

FIGS. 8A through 8D are functional block diagrams showing an example implementation 800 of the process 600 of FIGS. 6A through 6D using the MMA 700 of FIG. 7A. In an example, FIG. 8A is a first step 800*a* in the implementation 800, FIG. 8B is a second step 800*b*, FIG. 8C is a third step 800*c*, and FIG. 8D is a fourth step 800*d*. FIG. 8A corresponds to step 608 of the process 600, FIG. 8B corresponds to step 610, FIG. 8C corresponds to step 612, and FIG. 8D corresponds to step 614. Pattern marks in FIGS. 8A through 8D correspond to pattern marks in FIG. 6A, and similarly indicate which elements of matrix A are multiplied by a row of matrix B to provide partial products to a row of matrix C. In some examples, a step in the implementation 800 corresponds to a cycle of CLK or other clock signal of the clock 510.

FIG. 8A shows a state of the MMA 700 at the end of step 800*a*. In step 800*a*, a first row of matrix A is retrieved from the memory 506 and loaded into the A input memory 702, and a first row of matrix B is retrieved from the memory 506 and loaded into the B input memory 703. Loading row elements of a matrix into the A or B input memory 702 or 703 corresponds to first, second, third, and fourth column elements of the A or B matrix loaded into respective first (1), second (2), third (3), and fourth (4) memory elements of the A or B input memories 702 and 703.

In an alternative example, A and B input memories 702 and 703 are not used. Accordingly, A and B matrix elements are retrieved from the memory 506, provided to inputs of various respective memory elements of the MMA 700, and loaded into the respective memory elements at a next corresponding memory-loading clock edge (rising or falling edge).

Continuing in step 800*a*, the adder 730 outputs a zero value to the MUX 722, 724, 726, and 728 control inputs. Responsively, Ar1 732 receives and stores A(0,0) from the first element of the A input memory 702 via the first MUX 722. The first delay element 710 receives and stores A(0,1) from the second element of the A input memory 702. The second delay element 712 receives and stores A(0,2) from the third element of the A input memory 702. The fourth delay element 716 receives and stores A(0,3) from the fourth element of the A input memory 702.

Br1 740 receives and stores the first row of the B matrix from the B input memory 703. A(0,0), stored by Ar1 732, is multiplied by the first row of the B matrix, stored by Br1 740, and the result is added to the stored contents of Cr1 748 and then stored in Cr1 748.

A second row of matrix A is retrieved from the memory 506 and loaded into the A input memory 702, and a second row of matrix B is retrieved from the memory 506 and loaded into the B input memory 703. The adder 730 outputs a one value to the control inputs of the MUXes 722, 724, 726, and 728. Responsively, the first MUX 722 outputs A(0,1) and the second MUX 724 outputs A(1,0). Note that these matrix elements are not loaded into corresponding Ar registers (Ar1 732 and Ar2 734) until the next memory-loading clock edge, which occurs in step 800*b*.

FIG. 8B shows a state of the MMA 700 at the end of step 800*b*. In step 800*b*, Ar1 732 stores A(0,1) and Ar2 734 stores A(1,0). These matrix elements are received from the first and second MUXes 722 and 724, as described above at the end of step 800*a*.

The first delay element 710 receives and stores A(1,1) from the second element of the A input memory 702. The third delay element 714 receives and stores A(0,2) from the second delay element 712. The fifth delay element 718 receives and stores A(0,3) from the fourth delay element 716. The second delay element 712 receives and stores A(1,2) from the third element of the A input memory 702. The fourth delay element 716 receives and stores A(1,3) from the fourth element of the A input memory 702.

Br2 742 receives and stores the first row of the B matrix from Br1 740. Br1 740 receives and stores the second row of the B matrix from the B input memory 703. A(0,1), stored by Ar1 732, is multiplied by the second row of the B matrix, stored by Br1 740, and the result is added to the stored contents of Cr1 748 and then stored in Cr1 748. A(1,0), stored by Ar2 734, is multiplied by the first row of the B matrix, stored by Br2 742, and the result is added to the stored contents of Cr2 750 and then stored in Cr2 750.

A third row of matrix A is retrieved from the memory 506 and loaded into the A input memory 702, and a third row of matrix B is retrieved from the memory 506 and loaded into the B input memory 703. The adder 730 outputs a two value to the control inputs of the MUXes 722, 724, 726, and 728. Responsively, the first MUX 722 outputs A(0,2), the second MUX 724 outputs A(1,1), and the third MUX 726 outputs A(2,0). Note that these matrix elements are not loaded into corresponding Ar registers (Ar1 732, Ar2 734, and Ar3 736) until the next memory-loading clock edge, which occurs in step 800*c*.

FIG. 8C shows a state of the MMA 700 at the end of step 800*c*. In step 800*c*, Ar1 732 stores A(0,2), Ar2 734 stores A(1,1), and Ar3 736 stores A(2,0). These matrix elements are received from the first, second, and third MUXes 722, 724, and 726 as described above at the end of step 800*b*.

The first delay element 710 receives and stores A(2,1) from the second element of the A input memory 702. The third delay element 714 receives and stores A(1,2) from the second delay element 712. The sixth delay element 720 receives and stores A(0,3) from the fifth delay element 718. The fifth delay element 718 receives and stores A(1,3) from the fourth delay element 716. The second delay element 712 receives and stores A(2,2) from the third element of the A input memory 702. The fourth delay element 716 receives and stores A(2,3) from the fourth element of the A input memory 702.

Br3 744 receives and stores the first row of the B matrix from Br2 742. Br2 742 receives and stores the second row of the B matrix from Br1 740. Br1 740 receives and stores the third row of the B matrix from the B input memory 703. A(0,2), stored by Ar1 732, is multiplied by the third row of the B matrix, stored by Br1 740, and the result is added to the stored contents of Cr1 748 and then stored in Cr1 748. A(1,1), stored by Ar2 734, is multiplied by the second row of the B matrix, stored by Br2 742, and the result is added to the stored contents of Cr2 750 and then stored in Cr2 750. A(2,0), stored by Ar3 736, is multiplied by the first row of the B matrix, stored by Br3 744, and the result is added to the stored contents of Cr3 752 and then stored in Cr3 752.

A fourth row of matrix A is retrieved from the memory 506 and loaded into the A input memory 702, and a fourth row of matrix B is retrieved from the memory 506 and loaded into the B input memory 703. The adder 730 outputs a three value to the control inputs of the MUXes 722, 724, 726, and 728. Responsively, the first MUX 722 outputs A(0,3), the second MUX 724 outputs A(1,2), the third MUX 726 outputs A(2,1), and the fourth MUX 728 outputs A(3,0). Note that these matrix elements are not loaded into corresponding Ar registers (Ar1 732, Ar2 734, Ar3 736, and Ar4) until the next memory-loading clock edge, which occurs in step 800*d*.

FIG. 8D shows a state of the MMA 700 at the end of step 800*d*. In step 800*d*, Ar1 732 stores A(0,3), Ar2 734 stores A(1,2), Ar3 736 stores A(2,1), and Ar4 738 stores A(3,0). These matrix elements are received from the first, second, third, and fourth MUXes 722, 724, 726, and 728 as described above at the end of step 800*c*.

The first delay element 710 receives and stores A(3,1) from the second element of the A input memory 702. The third delay element 714 receives and stores A(2,2) from the second delay element 712. The sixth delay element 720 receives and stores A(1,3) from the fifth delay element 718. The fifth delay element 718 receives and stores A(2,3) from the fourth delay element 716. The second delay element 712 receives and stores A(3,2) from the third element of the A input memory 702. The fourth delay element 716 receives and stores A(3,3) from the fourth element of the A input memory 702.

Br4 746 receives and stores the first row of the B matrix from Br3 744. Br3 744 receives and stores second row of the B matrix from Br2 742. Br2 742 receives and stores the third row of the B matrix from Br1 740. Br1 740 receives and stores the fourth row of the B matrix from the B input memory 703.

A(0,3), stored by Ar1 732, is multiplied by the fourth row of the B matrix, stored by Br1 740, and the result is added to the stored contents of Cr1 748 and then stored in Cr1 748. A(1,2), stored by Ar2 734, is multiplied by the third row of the B matrix, stored by Br2 742, and the result is added to the stored contents of Cr2 750 and then stored in Cr2 750. A(2,1), stored by Ar3 736, is multiplied by the second row of the B matrix, stored by Br3 744, and the result is added to the stored contents of Cr3 752 and then stored in Cr3 752. A(3,0), stored by Ar4 738, is multiplied by the first row of the B matrix, stored by Br4 746, and the result is added to the stored contents of Cr4 754 and then stored in Cr4 754.

A first row of matrix A' is retrieved from the memory 506 and loaded into the A input memory 702, and a first row of matrix B' is retrieved from the memory 506 and loaded into the B input memory 703. The adder 730 outputs a zero value to the control inputs of the MUXes 722, 724, 726, and 728. Responsively, the first MUX 722 outputs A'(0,0), the second MUX 724 outputs A(1,3), the third MUX 726 outputs A(2,2), and the fourth MUX 728 outputs A(3,1). Note that these matrix elements are not loaded into corresponding Ar registers (Ar1 732, Ar2 734, Ar3 736, and Ar4) until the next memory-loading clock edge, which occurs in next step (not shown).

Data flow continues as described with respect to FIGS. 6A through 6D and 8A through 8D to multiply remaining elements of matrix A and matrix B, and to multiply other scheduled pairs of matrices, such as A' and B', A" and B", etc. Note that, responsive to the MUXes 722, 724, 726, and 728 and the control signal provided by the adder 730, first row elements of the A matrix are directed to Ar1 732, second row elements of the A matrix are directed to Ar2 734, third row elements of the A matrix are directed to Ar3 736, and fourth row elements of the A matrix are directed to Ar4 738.

FIG. 9 is an example functional block diagram of an example MMA 900 enabling an outer product version of the process 600 of FIG. 6. The MMA 900 is a second example implementation of the MMA 502 of FIG. 5. The MMA 900 is similar to the MMA 700 of FIG. 7A, but without the data routing circuit 706. Accordingly, the first memory element of the A input memory 702 outputs to Ar1 732. The second memory element of the A input memory 702 outputs to Ar2 734 via the first delay element 710. The third memory element of the A input memory 702 outputs to Ar3 736 via the second and third delay elements 712 and 714. The fourth memory element of the A input memory 702 outputs to Ar4 738 via the fourth, fifth, and sixth delay elements 716, 718, and 720.

Figure 10A:
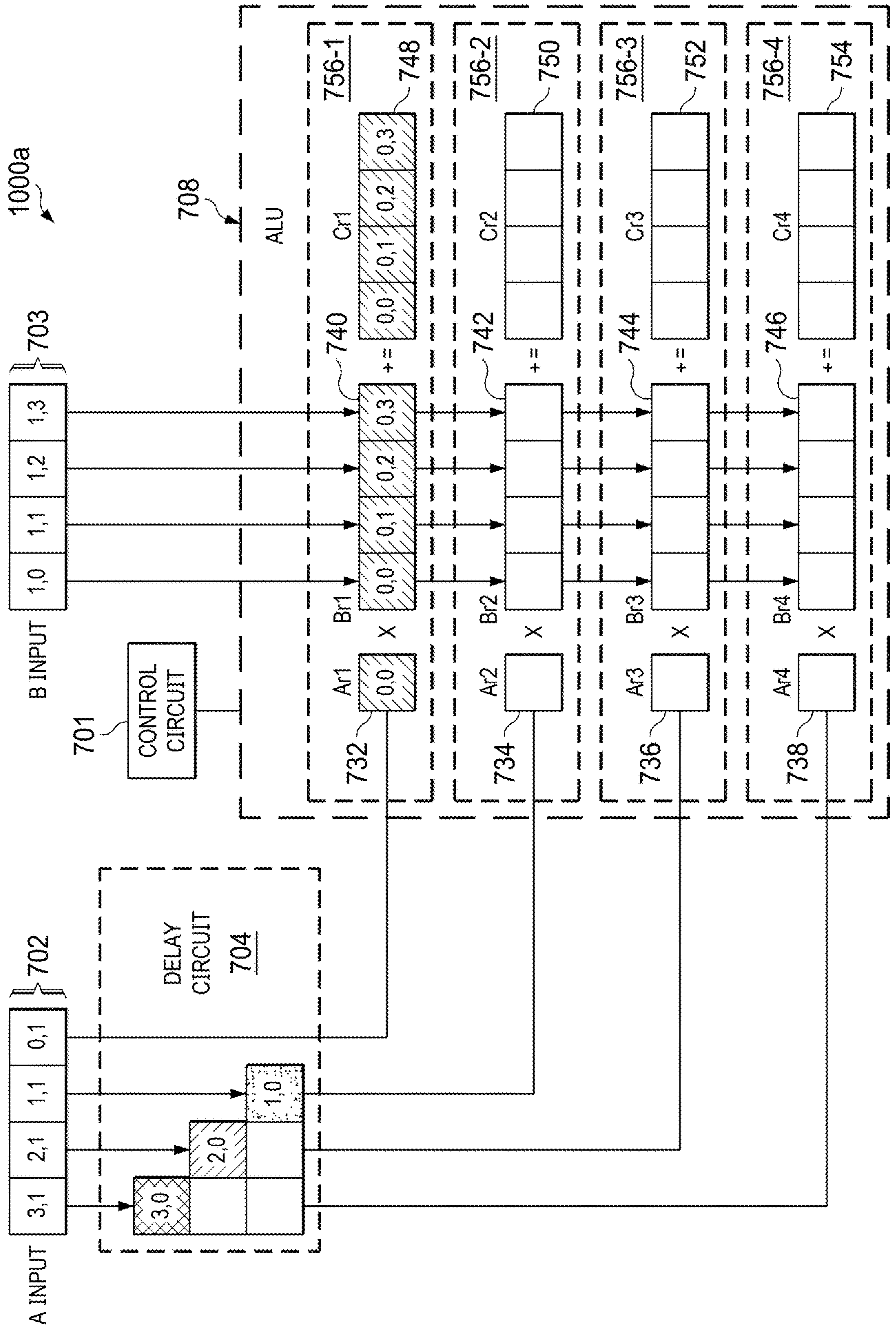
FIGS. 10A through 10D are example functional block diagrams showing an example implementation of an outer product version of the process of FIGS. 6A through 6D using the MMA of FIG. 9A.
Figure 10B:
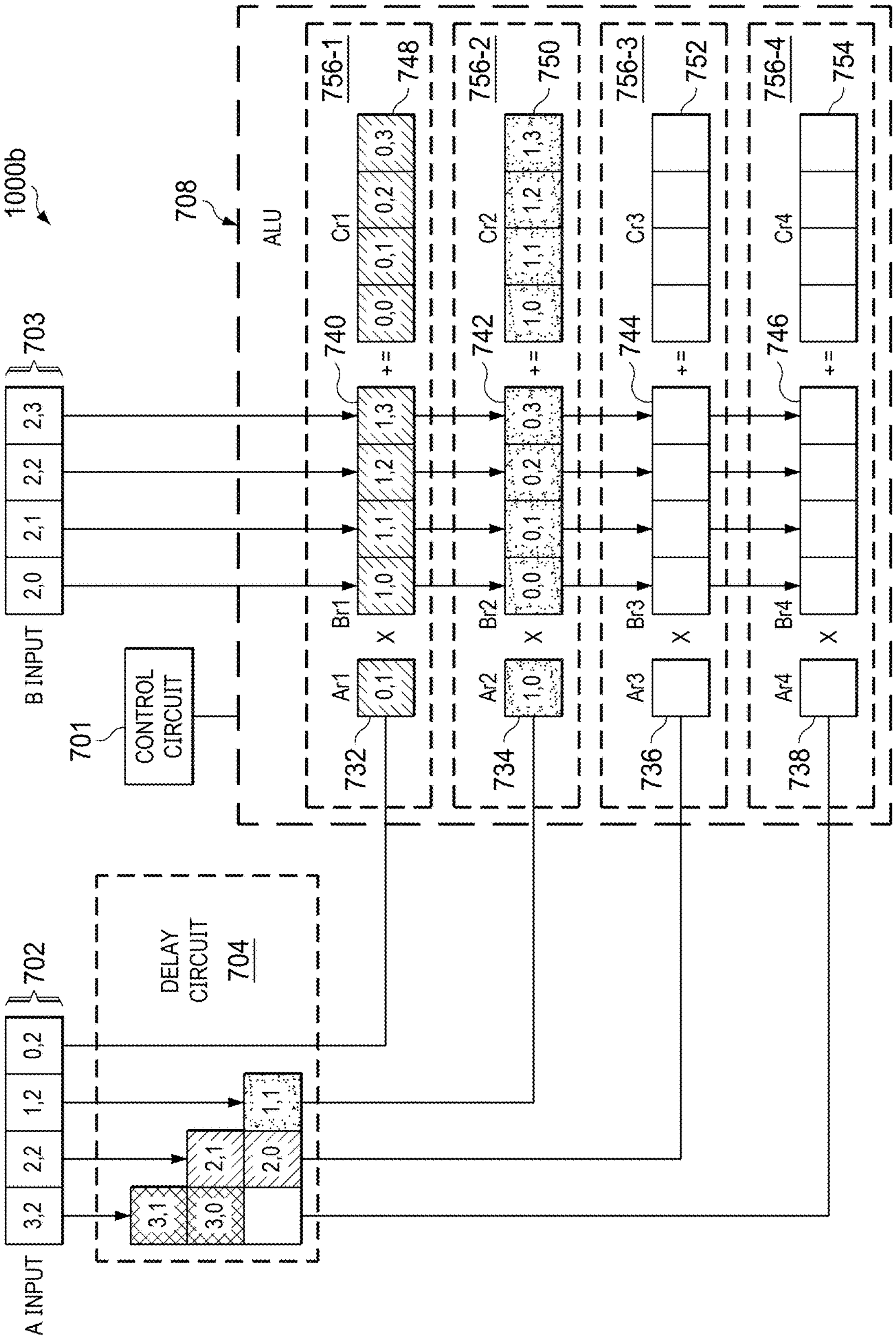
Figure 10C:
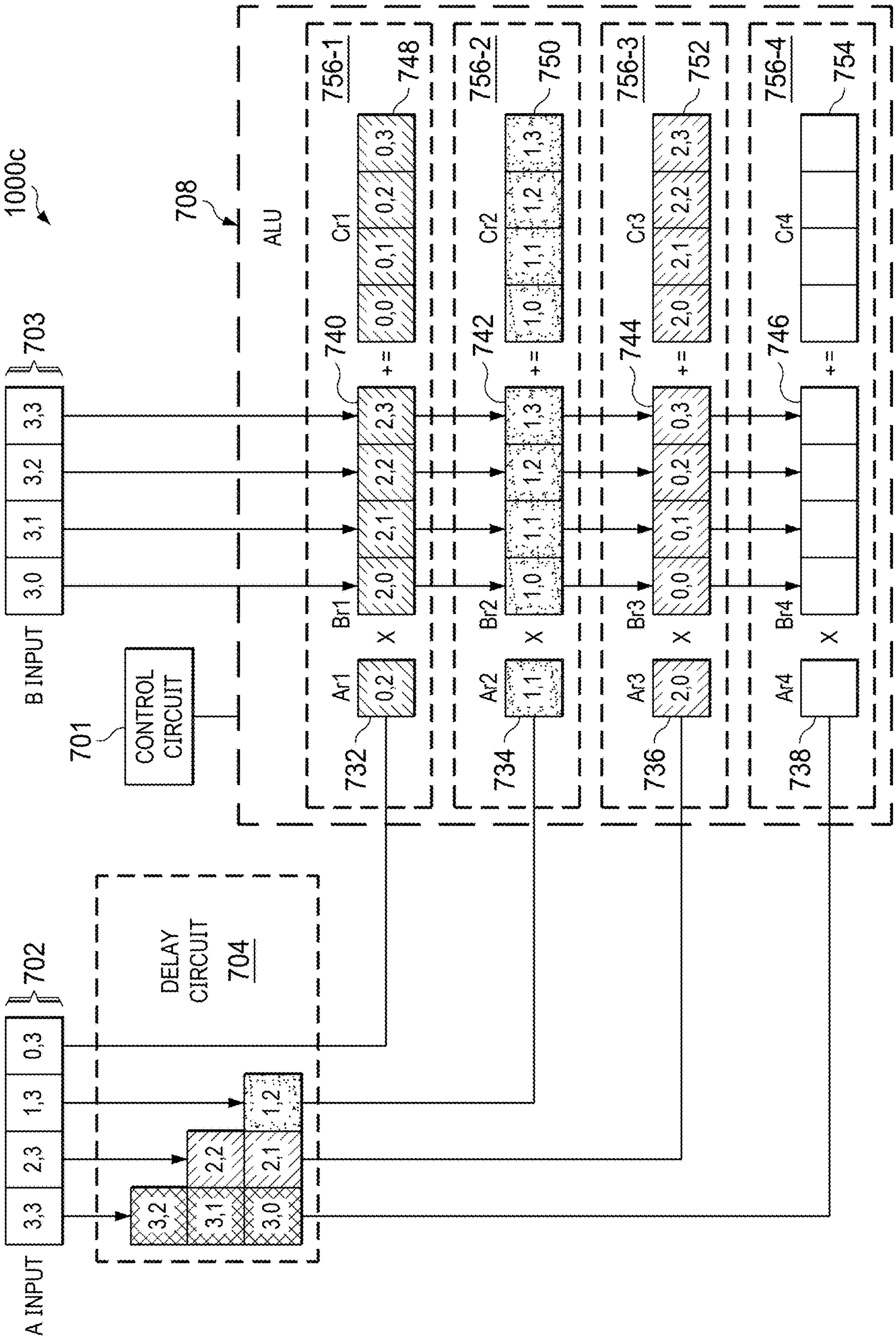
Figure 10D:
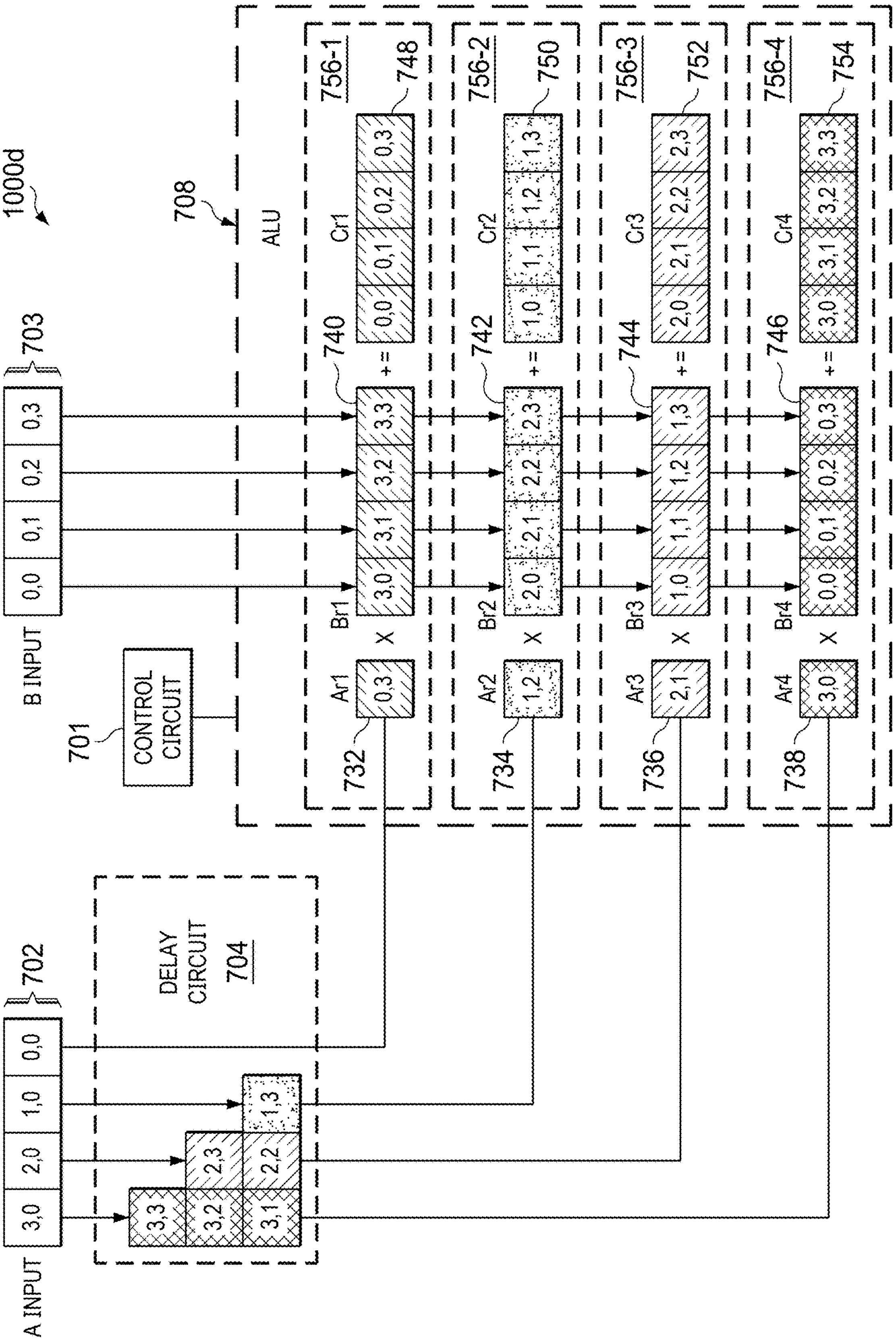

FIGS. 10A through 10D are example functional block diagrams showing an example implementation 1000 of an outer product version of the process 600 of FIGS. 6A through 6D using the MMA 900 of FIG. 9A. In an example, FIG. 10A shows a state of the MMA 900 after a first step 1000*a* in the implementation 1000. FIG. 10B shows a state of the MMA 900 after a second step 1000*b*. FIG. 10C shows a state of the MMA 900 after a third step 1000*c*. FIG. 10D shows a state of the MMA 900 after a fourth step 1000*d*. In some examples, a step in the implementation 800 corresponds to a cycle of CLK or other clock signal of the clock 510.

Data flow through the ALU 708 of the MMA 900 in the implementation 1000 is the same as the data flow through the ALU 708 of the MMA 700 in the implementation 800. Accordingly, with respect to data flow through the ALU 708, FIG. 10A corresponds to step 608 of the process 600, FIG. 10B corresponds to step 610, FIG. 10C corresponds to step 612, and FIG. 10D corresponds to step 614. Pattern marks in FIGS. 10A through 10D correspond to pattern marks in FIG. 6A, and similarly indicate which elements of matrix A are multiplied by a row of matrix B to provide partial products to a row of matrix C. A difference between the implementation 800 of FIGS. 8A through 8D and the implementation 1000 is that the A input memory 702 of the MMA 900 receives columns of the A matrix rather than rows of the A matrix.

Referring to FIG. 10A, in the first step 1000*a*, the A input memory 702 initially receives the first column of the A matrix. Elements of the first column of the A matrix are forwarded from the A input memory 702 to delay elements of the delay circuit 704 and to Ar1 732. Br1 740 receives the first row of the B matrix, and the multiply-accumulate operation is performed to provide partial products to Cr1 748. The A input memory 702 then receives the second column of the A matrix and the B input memory 703 receives the second row of the B matrix. Recall that outer product matrix multiplication corresponds to multiplication of A matrix columns by B matrix rows.

Note that first row elements of the A matrix are directed to Ar1 732, second row elements of the A matrix are directed to Ar2 734, third row elements of the A matrix are directed to Ar3 736, and fourth row elements of the A matrix are directed to Ar4 738.

Referring to FIG. 10B, in the second step 1000*b*, elements of the first column of the A matrix are forwarded through the delay circuit 704 and to Ar2 734. Elements of the second column of the A matrix are forwarded from the A input memory 702 to delay elements of the delay circuit 704 and to Ar1 732. Br2 742 receives the second row of the B matrix and Br1 740 receives the first row of the B matrix. Multiply-accumulate operations are performed to provide partial products to Cr2 750 and Cr1 748. The A input memory 702 then receives the third column of the A matrix and the B input memory 703 receives the third row of the B matrix.

Referring to FIG. 10C, in the third step 1000*c*, elements of the first column of the A matrix are forwarded through the delay circuit 704 and to Ar3 736. Elements of the second column of the A matrix are forwarded through the delay circuit 704 and to Ar2 734. Elements of the third column of the A matrix are forwarded from the A input memory 702 to delay elements of the delay circuit 704 and to Ar1 732. Br3 744 receives the first row of the B matrix, Br2 742 receives the second row of the B matrix, and Br1 740 receives the third row of the B matrix. Multiply-accumulate operations are performed to provide partial products to Cr3 752, Cr2 750, and Cr1 748. The A input memory 702 then receives the fourth column of the A matrix and the B input memory 703 receives the fourth row of the B matrix.

Referring to FIG. 10D, in the fourth step 1000*d*, the remaining element of the first column of the A matrix is forwarded to Ar4 738. Elements of the second column of the A matrix are forwarded through the delay circuit 704 and to Ar3 736. Elements of the second column of the A matrix are forwarded through the delay circuit 704 and to Ar2 734. Elements of the fourth column of the A matrix are forwarded from the A input memory 702 to delay elements of the delay circuit 704 and to Ar1 732. Br4 746 receives the first row of the B matrix, Br3 744 receives the second row of the B matrix, Br2 742 receives the third row of the B matrix, and Br1 740 receives the fourth row of the B matrix. Multiply-accumulate operations are performed to provide partial products to Cr4 754, Cr3 752, Cr2 750, and Cr1 748. The A input memory 702 then receives the first column of the A' matrix and the B input memory 703 receives the first row of the B' matrix.

Data flow continues as described with respect to FIGS. 6A through 6D and 10A through 10D to multiply remaining elements of matrix A and matrix B, and to multiply other scheduled pairs of matrices, such as A' and B', A" and B", etc. As described with respect to FIGS. 8A through 8D and 10A through 10D, elements of the A matrix from a single row or a single column, and rows of the B matrix, are processed in a time-staggered manner. Time-staggered processing of elements of the A matrix is responsive to functionality of the delay circuit 704 to stagger forwarding of elements of the A matrix from the A input memory 702 to inputs of the ALU 708 (Ar1 732, Ar2 734, Ar3 736, or Ar4 738). Time-staggered processing of elements of the B matrix is responsive to functionality of the rows of B registers (Br1 740, Br2 742, Br3 744, and Br4 746) to receive a row of the B matrix at Br1 740, and to sequentially forward the row of the B matrix to Br2 742, then Br3 744, then Br4 746, then out of the rows of B registers.

Time-staggered processing of elements of the multiplicand matrices that have been read from memory to be loaded into active registers enables the MMA 700 to avoid loading in an entire B matrix at a time or reading out for storage an entire C matrix at a time. This enables some or all of various benefits, including reduced or eliminated background memory cost, reduced foreground memory cost, reduced memory bandwidth requirements, reduced power cost, increased stability of power draw of a matrix multiplication process, reduced power control circuit design complexity responsive to increased power stability, increased memory stability responsive to increased power stability, and reduced device area cost responsive to reduced memory cost and/or reduced power control circuit cost.

FIG. 11 is an example functional block diagram of an example MMA 1100 enabling selection between the inner product process described with respect to FIGS. 6A through 6D and 8A through 8D, and the outer product process described with respect to FIGS. 10A through 10D. The MMA 1100 is a third example implementation of the MMA 502 of FIG. 5. The MMA 1100 is similar to the MMA 700 of FIG. 7A and the MMA 900 of FIG. 9, but it both includes the data routing circuit 706 and a data path via the data routing circuit 706, and includes a data path that skips the data routing circuit 706. Accordingly, the MMA 1100 includes a control circuit 1102 and a demultiplexer (DEMUX) 1104.

The first memory element of the A input memory 702 is connected to a first input of the DEMUX 1104, the second memory element of the A input memory 702 is connected to a second input of the DEMUX 1104, the third memory element of the A input memory 702 is connected to a third input of the DEMUX 1104, and the fourth memory element of the A input memory 702 is connected to a fourth input of the DEMUX 1104. First through fourth outputs of the DEMUX 1104 are connected to first through fourth inputs of the data routing circuit 706, corresponding to inputs of the MUXes 722, 724, 726, and 728. The four outputs of the data routing circuit 706 are connected to corresponding inputs of the ALU 708, accordingly, the inputs of Ar1 732, Ar2 734, Ar3 736, and Ar4 738. Fifth through eighth outputs of the DEMUX 1104 are connected to corresponding inputs of the ALU 708, accordingly, the inputs of Ar1 732, Ar2 734, Ar3 736, and Ar4 738.

A first output of the control circuit 1102 is connected to a control input of the DEMUX 1104. A second output of the control circuit 1102 is connected to a control input of the ALU 708. The control circuit 1102 selects between an inner product process by selecting either the first through fourth outputs of the DEMUX 1104 (inner product), or the fifth through eighth outputs of the DEMUX 1104 (outer product). In some examples, functionality of the control circuit 1102 with respect to the ALU 708 is similar to functionality of the control circuit 701 described with respect to FIGS. 7A and 7B.

In some examples, other arrangements of MUXes and/or DEMUXes, or other circuits, can be used to control whether to provide outputs of the delay circuit 704 to Ar1 732, Ar2 734, Ar3 736, and Ar4 738 ordered as described with respect to the MMA 700, or ordered as described with respect to the MMA 900. For example, an arrangement of one or more additional MUXes can be used to select values to provide to the control inputs of the MUXes 722, 724, 726, and 728, responsive to a selector signal provided by a control circuit (such as the control circuit 701 or the control circuit 1102).

Responsive to a first selector signal value, the additional MUXes provide the output of the adder 730 to the control inputs of the MUXes 722, 724, 726, and 728, so that the first selector value corresponds to signal pathing behavior of the MMA 700. Responsive to a second selector signal value, the additional MUXes provide the control inputs of the first and third MUXes 722 and 726 a zero value, and provide the control inputs of the second and fourth MUXes 724 and 728 a two value. Accordingly, the first, second, third, and fourth MUXes 722, 724, 726, and 728 will provide A matrix elements corresponding to the first, second, third, and fourth elements of the A input memory 702 to Ar1 732, Ar2 734, Ar3 736, and Ar4 738, respectively. The second selector value corresponds to signal pathing behavior of the MMA 900.

In another example, functionality of the DEMUX 1104 can be imitated using multiple additional MUXes downstream (with respect to a signal path between the delay circuit 704 and the ALU 708) of the MUXes 722, 724, 726, and 728. A control circuit (such as the control circuit 701 or the control circuit 1102) can be used to provide a selector signal to select whether the additional MUXes provide the outputs of the MUXes 722, 724, 726, and 728, or outputs of the delay circuit 704 ordered as described with respect to the MMA 900.

In some examples, a memory other than or in addition to registers is used.

In some examples, an MMA 700, 900, or 1100 is enabled to multiply matrices that do not have the same dimensions, and/or are not both (or are neither) square matrices, and/or that have one or more dimensions that are not an integer multiple of a number of memory elements (such as Br1 740 memory elements) of the MMA 700, 900, or 1100. In some examples, this includes zero padding of the input matrices (such as A and B matrices).

In some examples, the processor 504 is a digital signal processor (DSP), a central processing unit (CPU), or a microcontroller unit (MCU).

In some examples, the delay circuit 704 is configured to provide each of its data inputs to a corresponding data output of the delay circuit 704 with a different delay.

In some examples, functionality of the MUXes 722, 724, 726, and 728 of the data routing circuit 706 can be described as configured to sequentially and cyclically change which of its data inputs is provided to each of its data outputs.

In some examples, the data routing circuit 706 can be described as having N data inputs and N data outputs, the data routing circuit 706 configured to provide each $i^{th}$ data input of the FSM to a $j^{th}$ data output of the data routing circuit 706, and then successively to provide each $i^{th}$ data input of the data routing circuit 706 iteratively to a (j+k) modulo N data output of the data routing circuit 706, wherein k is iterated on each iteration.

In some examples, element-times-row multiplications can be described as performed in parallel for elements of matrix A 602 corresponding to different rows of matrix A 602. Accordingly, at a given time, each of the elements of matrix A 602 being multiplied is from a different row of matrix A 602 or from a row of a different submatrix of a larger matrix A.

In some examples, the data routing circuit 706 can be described as a finite state machine (FSM).

The term "couple" is used throughout the specification. The term may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

As used herein, the terms "terminal", "node", "interconnection", "pin", "ball" and "lead" are used interchangeably. Unless specifically stated to the contrary, these terms are generally used to mean an interconnection between or a terminus of a device element, a circuit element, an integrated circuit, a device or other electronics or semiconductor component.

While certain elements of the described examples may be included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Modifications are possible in the described examples, and other examples are possible within the scope of the claims.

What is claimed is:

1. A device comprising:

a delay circuit having a set of data inputs and a set of data outputs, wherein:

each of the set of data inputs of the delay circuit is coupled to a respective data output of the set of data outputs of the delay circuit; and a delay from each of the set of data inputs to the respective data output of the set of data outputs is different;

a data routing circuit having a set of data inputs and a set of data outputs, wherein the set of data inputs of the data routing circuit is coupled to the set of data outputs of the delay circuit; and an arithmetic logic unit (ALU) having a first set of inputs and a second set of inputs, the ALU including a first set of registers coupled to the first set of inputs, a second set of registers, and a third set of registers, wherein:

the first set of inputs of the ALU is coupled to the set of data outputs of the data routing circuit;

a first register of the second set of registers is coupled to the second set of inputs; and a remainder of the second set of registers is coupled to the first register.

2. The device of claim 1, wherein the data routing circuit is capable of sequentially and cyclically changing couplings between the set of data inputs of the data routing circuit and the set of data outputs of the data routing circuit.

3. The device of claim 1, wherein each register of the third set of registers corresponds to one register of the second set of registers and one register of the first set of registers.

4. The device of claim 1, wherein:

each register of the second set of registers is capable of storing a plurality of values; and the ALU is capable of:

multiplying a value stored in each register of the first set of registers by the plurality of values stored in a corresponding register of the second set of registers; and accumulating resulting partial products into corresponding registers in the third set of registers.

5. The device of claim 4, wherein the second set of registers is coupled in series starting with the first register of the second set of registers, so that each register of the second set of registers is capable of providing values to a sequentially next register of the second set of registers.

6. The device of claim 1, further comprising a clock circuit capable of providing a clock signal with a period;

wherein the delay from each of the set of data inputs of the delay circuit to the respective data output of the delay circuit is a different multiple of the period of the clock signal.

7. The device of claim 1, further comprising a clock circuit capable of providing a clock signal with a period;

wherein the delay circuit includes a set of delay elements, so that different numbers of delay elements of the set of delay elements are coupled in series between each of the set of data inputs of the delay circuit and the respective data output of the delay circuit, and each of the set of delay elements is clocked.

8. The device of claim 1, wherein:

the set of data inputs of the delay circuit has a number N data inputs;

the set of data inputs of the data routing circuit has N data inputs;

the set of data outputs of the data routing circuit has N data outputs; and the data routing circuit is capable of providing each $i^{th}$ data input of the set of data inputs of the data routing circuit to a $j^{th}$ data output of the set of data outputs of the data routing circuit, and then successively providing each $i^{th}$ data input of the set of data inputs of the data routing circuit iteratively to a (j+k) modulo N data output of the set of data outputs of the data routing circuit, wherein k is iterated on each iteration.

9. The device of claim 1, wherein:

the set of data inputs of the delay circuit has a number N data inputs;

the set of data inputs of the data routing circuit has N data inputs;

the set of data outputs of the data routing circuit has N data outputs;

the data routing circuit has:

a control input; and

N multiplexers, each of the multiplexers having N data inputs, a control input, and a data output;

the control inputs of the multiplexers are coupled to the control input of the data routing circuit;

each of the data inputs of the data routing circuit is coupled to a respective data output of the set of data outputs of the delay circuit;

each of the outputs of the multiplexers is coupled to a respective data output of the set of data outputs of the data routing circuit; and the inputs of the multiplexers are coupled to the set of data inputs of the data routing circuit so that each of the outputs of the multiplexers is configured to couple to a respective data output of the set of data outputs of the delay circuit responsive to the control input of the data routing circuit.

10. The device of claim 9, further comprising:

a clock circuit having an output and capable of providing a clock signal; and an adder having first and second inputs, a clock input, and an output, the clock input of the adder coupled to the output of the clock circuit, and the output of the adder coupled to the first input of the adder and to the control inputs of each of the multiplexers of the data routing circuit.

11. A device comprising:

a delay circuit having a set of data inputs and a set of data outputs, wherein:

each of the set of data inputs of the delay circuit is coupled to a respective data output of the set of data outputs of the delay circuit; and a delay from each of the set of data inputs to the respective data output of the set of data outputs is different; and an arithmetic logic unit (ALU) having a first set of inputs and a second set of inputs, the ALU including a first set of registers coupled to the first set of inputs, a second set of registers, and a third set of registers, wherein:

the first set of inputs of the ALU is coupled to the set of data outputs of the delay circuit;

a first register of the second set of registers is coupled to the second set of inputs; and a remainder of the second set of registers is coupled to the first register.

12. The device of claim 11, wherein each register of the third set of registers corresponds to one register of the second set of registers and one register of the first set of registers.

13. The device of claim 11, wherein:

each register of the second set of registers is capable of storing a plurality of values; and the ALU is capable of:

multiplying a value stored in each register of the first set of registers by the plurality of values stored in a corresponding register of the second set of registers; and accumulating resulting partial products into corresponding registers in the third set of registers.

14. The device of claim 13, wherein the second set of registers is coupled in series starting with the first register of the second set of registers, so that each register of the second set of registers is capable of providing values to a sequentially next register of the second set of registers.

15. The device of claim 11, further comprising a clock circuit capable of providing a clock signal with a period;

wherein the delay circuit includes a set of delay elements, so that different numbers of delay elements of the set of delay elements are coupled in series between each of the set of data inputs of the delay circuit and the respective data output of the delay circuit, and each of the set of delay elements is clocked.

16. The device of claim 11, wherein the set of data inputs of the delay circuit has a number N data inputs, the device further comprising:

a data routing circuit that has a set of N data inputs and a set of N data outputs, wherein:

the data routing circuit is capable of providing each $i^{th}$ data input of the set of data inputs of the data routing circuit to a $j^{th}$ data output of the set of data outputs of the data routing circuit, and then successively providing each $i^{th}$ data input of the set of data inputs of the data routing circuit iteratively to a (j+k) modulo N data output of the set of data outputs of the data routing circuit; and k is iterated on each iteration.

17. The device of claim 11, wherein the set of data inputs of the delay circuit has a number N data inputs, the device further comprising:

a data routing circuit that has:

a set of N data inputs;

a control input;

a set of N data outputs; and

N multiplexers, each of the multiplexers having N data inputs, a control input, and a data output, wherein:

the control inputs of the multiplexers are coupled to the control input of the data routing circuit;

each of the data inputs of the data routing circuit is coupled to a respective data output of the set of data outputs of the delay circuit;

each of the outputs of the multiplexers is coupled to a respective data output of the set of data outputs of the data routing circuit; and each of the data outputs of the data routing circuit is coupled to a respective input of the first set of inputs of the ALU; and the inputs of the multiplexers are coupled to the set of data inputs of the data routing circuit so that each of the outputs of the multiplexers is configured to couple to a respective data output of the set of data outputs of the delay circuit responsive to the control input of the data routing circuit.

18. A system comprising:

a delay circuit having a set of data inputs and a set of data outputs, wherein:

each of the set of data inputs of the delay circuit is coupled to a respective data output of the set of data outputs of the delay circuit; and a delay from each of the set of data inputs to the respective data outputs of the set of data outputs is different;

a data routing circuit having a set of data inputs and a set of data outputs, wherein the set of data inputs of the data routing circuit is coupled to the set of data outputs of the delay circuit;

an arithmetic logic unit (ALU) having a first set of inputs and a second set of inputs, the ALU including a first set of registers coupled to the first set of inputs, a second set of registers, and a third set of registers, wherein:

the first set of inputs of the ALU is coupled to the set of data outputs of the data routing circuit;

a first register of the second set of registers is coupled to the second set of inputs; and a remainder of the second set of registers is coupled to the first register;

a memory coupled to the delay circuit and to the ALU, the memory capable of storing instructions; and a processor coupled to the ALU and to the memory, the processor capable of executing the instructions and of controlling the ALU to multiply values stored in the first registers by values stored in the second registers to generate partial products, and to accumulate the partial products into the third registers.

19. The system of claim 18, further comprising:

a multiplier including first and second inputs and an output, the first input of the multiplier coupled to a register of the first set of registers, and the second input of the multiplier coupled to a register of the second set of registers; and an adder including first and second inputs and an output, a register of the third set of registers coupled to the first input of the adder and the output of the adder, and the second input of the adder coupled to the output of the multiplier.

20. The system of claim 18, wherein the memory is coupled to the set of data inputs of the delay circuit, to the first register of the second set of registers, and to each register of the third set of registers.

* * * * *